(12) United States Patent
Chung et al.

(10) Patent No.: US 11,284,159 B2
(45) Date of Patent: Mar. 22, 2022

(54) SYSTEMS AND METHODS FOR TRANSMITTING MEDIA ASSOCIATED WITH A MEASURE OF QUALITY BASED ON LEVEL OF GAME PLAY IN AN INTERACTIVE VIDEO GAMING ENVIRONMENT

(71) Applicant: ROVI GUIDES, INC., San Jose, CA (US)

(72) Inventors: David D. Chung, Walnut Creek, CA (US); Walter R. Klappert, North Hollywood, CA (US)

(73) Assignee: Rovi Guides, Inc., San Jose, CA (US)

( * ) Notice: Subject to any disclaimer, the term of this patent is extended or adjusted under 35 U.S.C. 154(b) by 240 days.

(21) Appl. No.: 16/800,697

(22) Filed: Feb. 25, 2020

(65) Prior Publication Data

US 2020/0260148 A1 Aug. 13, 2020

Related U.S. Application Data

(63) Continuation of application No. 16/243,931, filed on Jan. 9, 2019, now Pat. No. 10,616,655, which is a continuation of application No. 15/979,939, filed on May 15, 2018, now Pat. No. 10,219,041, which is a continuation of application No. 15/827,485, filed on Nov. 30, 2017, now Pat. No. 9,992,543, which is a continuation of application No. 15/286,846, filed on Oct. 6, 2016, now Pat. No. 9,848,245, which is a continuation of application No. 14/102,149, filed on Dec. 10, 2013, now Pat. No. 9,486,698, which is a
(Continued)

(51) Int. Cl.
| | | |
|---|---|---|
| A63F 13/00 | (2014.01) | |
| H04N 21/478 | (2011.01) | |
| H04N 21/274 | (2011.01) | |
| H04N 21/4784 | (2011.01) | |
| H04N 21/81 | (2011.01) | |
| A63F 13/25 | (2014.01) | |
| A63F 13/35 | (2014.01) | |
| A63F 13/52 | (2014.01) | |

(52) U.S. Cl.
CPC ........ *H04N 21/4781* (2013.01); *A63F 13/00* (2013.01); *A63F 13/25* (2014.09); *A63F 13/35* (2014.09); *A63F 13/52* (2014.09); *H04N 21/274* (2013.01); *H04N 21/4784* (2013.01); *H04N 21/812* (2013.01)

(58) Field of Classification Search
None
See application file for complete search history.

(56) References Cited

U.S. PATENT DOCUMENTS

| | | |
|---|---|---|
| 6,544,123 B1 | 4/2003 | Tanaka et al. |
| 2006/0080702 A1 | 4/2006 | Diez et al. |
| 2011/0018982 A1 | 1/2011 | Shibamiya et al. |

*Primary Examiner* — Paul A D'Agostino
(74) *Attorney, Agent, or Firm* — Haley Guiliano LLP

(57) ABSTRACT

Systems and methods for incorporating online user generated media content (e.g., videos) into an interactive video gaming environment are provided. Media assets that are associated with different measures of quality generated by users are stored on a remote server. A player action is received by the remote server. A determination is made as to which one of the plurality of levels of the interactive video gaming environment corresponds to the action. One of the videos associated with one of the measures of quality is selected based on the determination of the level corresponding to the action. The selected video is transmitted to the player.

10 Claims, 14 Drawing Sheets

Related U.S. Application Data continuation of application No. 13/118,712, filed on May 31, 2011, now Pat. No. 8,657,680.

SYSTEMS AND METHODS FOR TRANSMITTING MEDIA ASSOCIATED WITH A MEASURE OF QUALITY BASED ON LEVEL OF GAME PLAY IN AN INTERACTIVE VIDEO GAMING ENVIRONMENT

CROSS-REFERENCE TO RELATED APPLICATION(S)

This application is a continuation of U.S. patent application Ser. No. 16/243,931, filed Jan. 9, 2019, which is a continuation of U.S. patent application Ser. No. 15/979,939, filed May 15, 2018, now U.S. Pat. No. 10,219,041, which is a continuation of U.S. patent application Ser. No. 15/827,485, filed Nov. 30, 2017, now U.S. Pat. No. 9,992,543, which is a continuation U.S. patent application Ser. No. 15/286,846, filed Oct. 6, 2016, now U.S. Pat. No. 9,848,245, which is a continuation of U.S. patent application Ser. No. 14/102,149, filed Dec. 10, 2013, now U.S. Pat. No. 9,486,698, which is a continuation application of U.S. patent application Ser. No. 13/118,712, filed May 31, 2011, now U.S. Pat. No. 8,657,680, each of which are hereby incorporated by reference herein in their entireties.

BACKGROUND

Traditional interactive video game systems encompass stand-alone software applications with which the user can interact to progress through a particular storyline. These traditional interactive video game systems have a predefined program source code and storyline where the set of outcomes based on a given set of player actions in the game is limited by the program source code and updates or expansion packs to the program source code. Although entertaining, such traditional systems lose their entertainment value after a player is exposed to all the levels or all the possible outcomes. In particular, because the outcomes based on a given set of player actions in these traditional systems become predictable, these systems lose their entertainment value over time.

More sophisticated interactive video game systems provide a multiplayer environment where multiple users can play the game together within the confines of the interactive video game system application. These advanced systems provide a more diverse set of outcomes based on a given set of player actions since the outcomes are affected by multiple players or users. However, even in these more sophisticated systems, the outcomes become predictable over time.

SUMMARY OF THE INVENTION

Accordingly, systems and methods for incorporating online user generated media content (e.g., videos) into an interactive video gaming environment are provided in accordance with various embodiments of the present invention.

In some embodiments, systems and methods for selecting for display to a player, based on an action of the player in an interactive video gaming environment, reward and penalty videos received from other online users are provided. In particular, an action may be received from a player at a remote server. The action may be an audio, video, graphic, and/or image created by the player. In some implementations, the action may include receiving a video from the player as part of the game play, receiving from the player a response to an inquiry or question provided during the game play, receiving an indication that the player completed a segment or stage of the interactive gaming environment, and receiving an indication that the player reached or failed to reach a segment of one of the plurality of levels of the interactive gaming environment. The remote server may store the action and make the action available to a plurality of users for ranking. After the plurality of users rank the action, the remote server may assign a rank to the action. In some implementations, the remote server may determine whether the rank corresponds to a reward or penalty.

In some implementations, the remote server may select a media asset that is categorized as a reward or penalty based on whether the rank corresponds to a reward or penalty. The reward or penalty media asset may be a video, audio, image, and/or graphic created by another user of the interactive video game and categorized by the user as a reward or penalty media asset. In particular, the remote server may select a reward media asset when the rank corresponds to a reward. In some implementations, the remote server may determine whether the selected media asset has been previously provided or made available to the user/player. When the media asset has previously been provided or made available to the user/player, the remote server may select an alternate equivalent reward or penalty media asset that has not been made available or provided to the user/player. The remote server may transmit or make available the selected reward or penalty media asset to the player who submitted the action.

In some embodiments, systems and methods for selecting for display to a player, based on an action of the player in an interactive video gaming environment, three-dimensional (3D) or stereoscopic reward and penalty videos received from other online users are provided. In particular, any portion of the interactive video gaming environment may be presented to the user in 3D. In some implementations, the actions generated by the player may be created and stored in 3D. In some implementations, the reward or penalty media assets generated by users of the interactive video gaming environment may be created and stored in 3D. In some implementations, the user/player may interact with the 3D interactive video gaming environment using a stereoscopic optical device. The images of the interactive video gaming environment, when viewed through the stereoscopic optical device, may appear to the user/player in 3D space. In particular, one portion of the interactive video gaming environment may appear closer to the user/player than another.

In some embodiments, systems and methods for selecting for display to a player, based on an action of the player in an interactive video gaming environment and the level of game play, videos being associated with a certain measure of quality are provided. In particular, each of the reward or penalty media assets stored on the remote server may be associated with a measure of quality. The measure of quality may include image resolution, type or particular author of the media asset, length, popularity the videos among a community, content quality of the videos, originality of the videos, and/or rarity of the videos. In some implementations, the remote server may determine what level of authorization the user/player has (e.g., what level within the interactive video gaming environment the user/player is in or what type of package of the gaming environment the user/player is using). The remote server may select a reward or penalty media asset based on the level of authorization the user/player has. In particular, the remote server may select a reward or penalty media asset having a high measure of quality when the user/player has one level of authorization (e.g., the user is in or above level 6 out of 10 in the game).

Similarly, the remote server may select a reward or penalty media asset having a low measure of quality when the user/player has different lower level of authorization (e.g., the user is in or below level 5 out of 10 in the game).

In some embodiments, systems and methods for selecting for display to a player, based on an action of the player in an interactive video gaming environment, videos that are part of a series of videos are provided. In particular, the reward or penalty media asset may be an episode of a series of a media asset. In some implementations, when the action is assigned a high rank, the remote server may select a next episode (e.g., a future episode, clip or segment) in the series for provision to the player. Similarly, when the action is assigned a low rank, the remote server may select a repeat or previous episode in the series for provision to the player.

In some embodiments, systems and methods for selecting for display to a player, based on an action of the player in an interactive video gaming environment, videos with or without advertisements are provided. In particular, the remote server may determine whether or not to include advertisements with the reward or penalty media assets based on the level of authorization associated with the user/player. In some implementations, the remote server may embed or associate an advertisement with a reward or penalty media asset when the user/player has one level of authorization. Similarly, the remote server may prevent or not include an advertisement with a reward or penalty media asset when the user/player has a different higher level of authorization. The level of authorization may depend on a rank the player receives for a given action, whether the player purchased a particular version of the interactive video gaming environment, the level within the game the player is in, and/or whether the user ranks a predetermined number of other player actions.

In some embodiments, systems and methods for selecting for display to a player, based on a duration of using exercise equipment, videos are provided. In particular, the user equipment may monitor an exercise attribute of the user (e.g., a length of time, a heart rate, a distance, etc.) for a given period. The user equipment may compare the monitored attribute to a predetermined threshold corresponding to the attribute. Until the monitored attribute exceeds the predetermined threshold, the user equipment may present one or more media assets associated with a particular measure of quality. Once the predetermined threshold is exceeded by the monitored attribute, the user equipment may adjust the predetermined threshold and present one or more media assets associated with a higher measure of quality than the previously presented media assets.

In some embodiments, systems and methods for limiting a number of videos a user stores in the interactive video gaming environment based on a number of other player actions the user acts on or judges are provided. In particular, the remote server may prevent the player from submitting an action for ranking when the player lacks a sufficient authorization level. The player may lack sufficient authorization level until the player ranks a predetermined number of other player actions. In some implementations, after the player ranks a predetermined number of other player actions, the player may be permitted to submit the action for ranking to the remote server.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
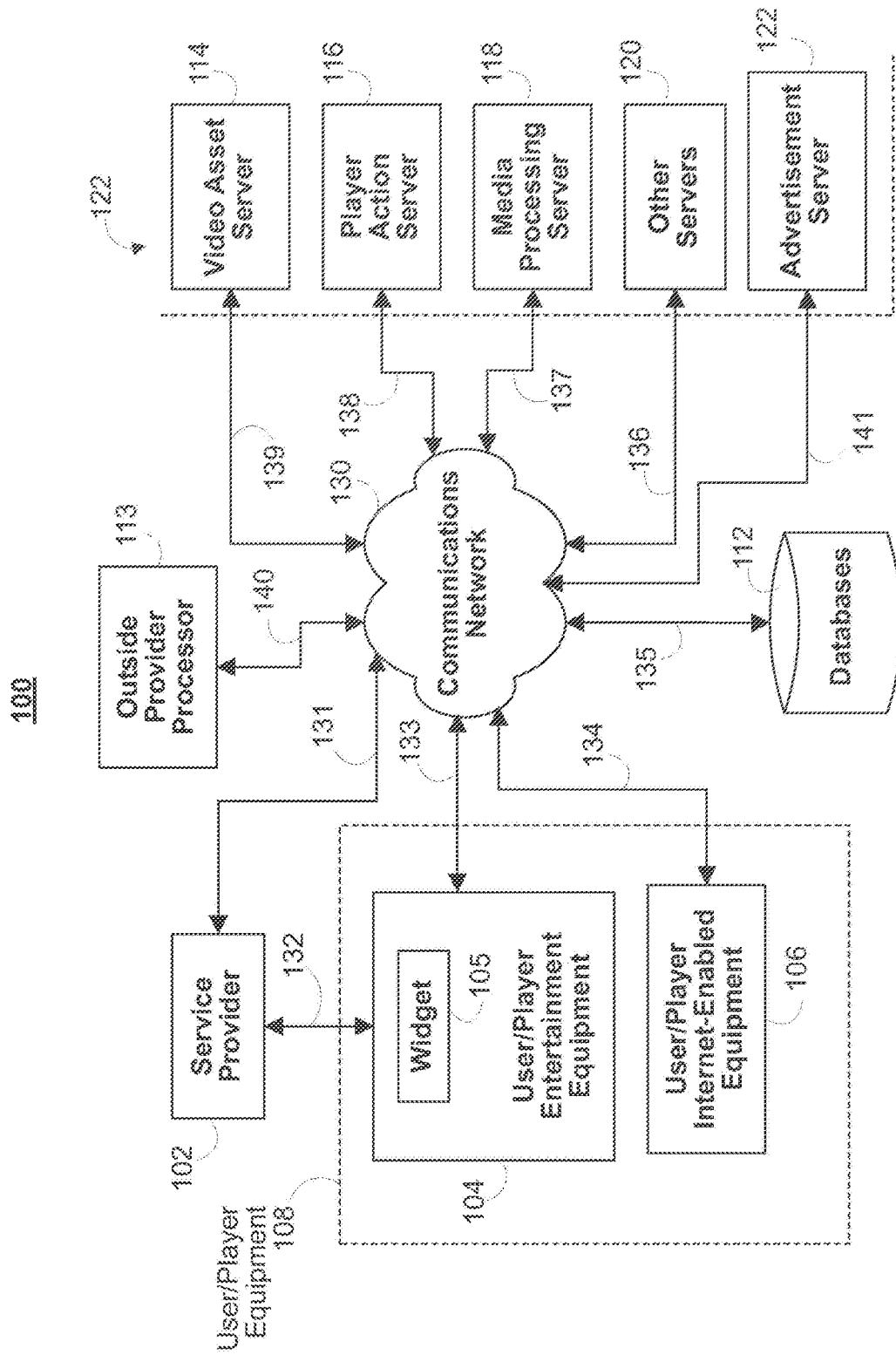
FIG. 1 illustrates an example of a system for generating media based on a player action in an interactive video gaming environment in accordance with some embodiments of the present invention.

An interactive video gaming environment is an entertainment application that is used by users and players. The interactive video gaming environment may be provided in whole or in part at an arcade, at home on a television or personal computer, on a mobile computing device that can execute software applications, a mobile phone, and as a handheld portable game. The interactive video gaming environment may be packaged in large consoles, game packs that can only be played on the same manufacturer's hardware (i.e., Nintendo, Sega Genesis, and Sony PlayStation), applications designed for mobile phone operating systems (e.g., ANDROID applications or IPHONE applications) and as CD-ROMs, DVD or other permanent or temporary removable storage medium. The interactive video gaming environment is made up of a program or software that instructs processing circuitry to display specific visual and audio effects and receive various inputs/responses from a user or player. In some embodiments, the interactive video gaming environment may be implemented as a widget on a television, user equipment device or other suitable media equipment device. Interactive video gaming environment may be referred to above and below interchangeably with interactive gaming environment, video game, electronic gaming environment, electronic interactive gaming environment, electronic interactive video gaming environment, electronic interactive video game, media guidance application, media gaming environment, interactive media gaming environment, interactive game, or any combination thereof.

Widgets are applications (i.e., collections of instructions executable by a processor) that provide information from the Internet and/or otherwise remotely accessible servers (hereinafter "remote servers") to a user. A widget may provide this information through web services and/or using any suitable communication protocol (e.g., TCP/IP, IPTV, etc.). Widgets may also perform local processing tasks, such as guiding a player through the interactive video gaming environment, receiving player actions or user inputs, and generating, providing and/or displaying reward and penalty media assets or media content (e.g., video assets of other users or audio assets of other users) to the player. These widget capabilities, as well as additional widget functionality, will be described in greater detail below.

As referred to herein a media asset categorized as a "reward" is a media asset that includes content desirable to the player that encourages the player to provide an action that deserves a reward in the future and/or provides positive reinforcement as to the previous action performed by the player. As referred to herein a media asset categorized as a "penalty" is a media asset that includes content undesirable to the player that discourages the player from providing an action that deserves a penalty in the future and/or provides negative reinforcement as to the previous action performed by the player.

A widget may run on a television, user equipment device associated with a television, and/or other user equipment devices capable of providing media to a user (e.g., laptop, a mobile phone, e-reader, camera, computer, mobile device, or video player). Television widgets are widgets that run strictly on the hardware platform (e.g., control circuitry) of a television. Typically, television widgets have limited interactions with external user equipment devices and databases, such as set top boxes and third party servers. It will be understood that where the below description refers to a widget or widgets, the term is inclusive of television widgets and other applications with widget-type functionality. For example, a widget may include a JAVA applet executable on a mobile device or any other software application executable on the mobile device (e.g., iPhone application or Android application). JAVA is a registered trademark owned by Sun Microsystems, Inc. In some implementations, the widget may be downloaded or received from a remote server to the mobile device over an open market for free or for a fee from an application store (e.g., marketplace or app store) which is hosted by a remote server. Similarly, the interactive video gaming environment or portions of the interactive video gaming environment may be downloaded or received from a remote server to the mobile device over an open market for free or for a fee from an application store (e.g., marketplace or app store) which is hosted by the remote server.

It should be understood that although the interactive video gaming environment is described in the context of being implemented using a widget running on a media equipment device, the interactive video gaming environment may be implemented in whole or in part using any suitable software application that is executed on a suitable device. In addition, one user or player may use the interactive video gaming application that is implemented using a widget on one type of user equipment device while another user or player may use the interactive video gaming application that is implemented using software application on another type of device such as a mobile computing device (e.g., cellular telephone). The various implementations and means of accessing the interactive video gaming environment are discussed in greater detail in connection with FIGS. 3*a-c*.

In accordance with some embodiments of the present invention, a widget may be used to generate and display an interactive screen of the interactive video gaming environment and may be used to receive inputs from a user or player, transmit those inputs to a remote video game server and receive data from the video game server or other servers associated with the interactive video gaming environment. The player may access the widget on a player equipment device (or player equipment) to use the screen of the interactive video gaming environment. For example, the screen may be a welcome screen with game play instructions, a screen that has various control options (e.g., capture image or video content), a screen of one of the levels of the game allowing the user to navigate through the level, a screen that displays a question or query for the user to answer, or any other screen shown and described in connection with FIGS. 3-8. In some implementations, the widget may communicate with an internal or external gaming database or server to determine the player's position (e.g., the state of game play of a given player) in the interactive gaming environment. Based on the player's position, the widget may generate the appropriate display screen or transmit/receive corresponding data from the video game server.

In some embodiments, the player may interact with the interactive screen of the widget by way of player actions. A player action may include at least one of receiving a video from the player as part of the game play, receiving from the player a response to an inquiry or question provided during the game play, receiving an indication that the player completed a segment or stage of the interactive video gaming environment, receiving an indication that the player reached or failed to reach a segment of one of the plurality of levels of the interactive gaming environment, or any other input received from the player that affects game play of the interactive video gaming environment. The player action may be transmitted to a remote server (e.g., video game server) by the widget or the player equipment. As defined herein, the term "level" means certain access rights or game playing space within the video gaming environment available to the player during the course of completing a discrete objective of the video gaming environment. In addition, the term "level" may also refer to a degree of difficulty within the video gaming environment, where the degree of difficulty may increase or decrease for each level within the video gaming environment.

In some embodiments, users may interact with one of the interactive screens generated by a widget of user equipment device to transmit media assets (e.g., audio and/or video) to, or receive player actions from, the video game server (e.g., remote server). Media assets may include conventional television programming or video (provided via traditional broadcast, cable, satellite, Internet, or other means), as well as pay-per-view programs or video, on-demand programs or video (as in video-on-demand (VOD) systems), Internet content (e.g., streaming media, downloadable media, Webcasts, etc.), and other types of media or video content. The widget may store the media asset on the remote server or transmit the media asset in real-time, live format to the player (e.g., in a peer-to-peer manner or through the remote server). In particular, the users may generate a media asset that is categorized as a reward or penalty. In some implementations, the users may generate the media asset using the user equipment device (e.g., a video camera or microphone coupled to or embedded within the user equipment device, such as a video camera positioned in a plane of the display screen of the user equipment device—front-facing video camera). The remote server may store the received media asset in a database with indications of whether each media asset is categorized as a reward or penalty. The database may be in a same location as the remote server, remote from the remote server and the user equipment device, or within the remote server.

In some embodiments, each of the media assets received by the remote server from the users may be associated with a particular measure of quality. For example, the measure of quality may include popularity of the content of the media asset (e.g., popularity of a celebrity in the media asset, where the measure of quality is greater for celebrities that are more popular). The measure of quality may include picture resolution, length of the videos, popularity the media asset among a community, content quality of the media asset, originality of the media asset, rarity of the media asset, or any other suitable value that is attributed to the media asset that can be used to indicate that one media asset is "better" or more valuable than another media asset. The remote server may store the received media asset in a database with indications of the quality associated with each media asset. The database may be in a same location as the remote server, remote from the remote server and the user equipment device, or housed within the remote server.

It should be understood that any reference to "remote server" made above and below refers to any combination of video asset server, player action server, media processing server, advertising server, or any other server necessary for implementing and/or coordinating operation of the video gaming environment. Video asset server, player action server, media processing server, advertising server, or any other server necessary for implementing and/or coordinating operation of the video gaming environment may each be in one location, remote from each other, housed within the same device, or any combination thereof.

In some embodiments, a user may generate a sequence of media asset segments that when played back represent a video or audio media asset. For example, the user may generate a video or audio media asset and break up the video or audio media asset into equal or unequal sequential media asset segments. In some implementations, the remote server may automatically retrieve from the Internet (e.g., by searching for particular content) segments of a media asset that together represent a video or audio media asset. For example, each segment may be an episode of a series and the video or audio media asset may be a portion of or the entire series of the media asset. Any reference above or below to the term "automatically" is synonymous with the phrase "without user input" or "without further user input."

In some embodiments, the remote server may transmit or make available a received player action to a community or group of users (hereinafter "users"). In some implementations, the users do not include the player. The users may access a widget or a screen of the interactive video gaming environment on their own user equipment device (e.g., by navigating to an appropriate website), receive one or more player actions from one or more players and assign ranks to the received actions.

In some embodiments, the remote server may automatically cross-reference the received player action with expected player actions to associate a rank with the action. For example, the remote server may determine whether a response to a question received as the player action is correct or incorrect. When the player action is correct, the remote server may associate a high rank with the player action and when incorrect, the remote server may associate a low rank with the player action. In some implementations, the remote server may compare the received player action with similar player actions received from other players to determine whether the player action is substantially similar to a majority or a minority of the other player actions. When the player action is substantially similar to the majority, the remote server may associate a high rank with the player action and when the player action is substantially similar to the minority (or is not substantially similar to the majority), the remote server may associate a low rank with the player action.

In some embodiments, the remote server may make available the player action to users of the interactive video gaming environment to receive input from each of the users indicating whether they liked or disliked the action. In some embodiments, the remote server may prevent users or players from transmitting actions or media assets before the users or players provide input indicating their like or dislike for a predetermined number of player actions. For example, upon receiving a request from a user to transmit a media asset (e.g., as a reward or penalty), the remote server may determine whether the user has ranked (e.g., indicated a like or dislike) for a predetermined number of player actions (e.g., whether the user ranked more than five other player actions). If the user has not ranked more than the predetermined number of player actions, the remote server may transmit a quantity or a certain number (e.g., the predetermined number) of player actions to the user for ranking. After the user ranks the predetermined number of player actions, the remote server may allow the user to upload, transmit, store or provide the requested media asset to the remote server. The remote server may be configured to perform a similar determination and prevention when the remote server receives a request from a player to transmit or rank a given player action. The terms "action" and "player action" are used interchangeably throughout but should be understood to have the same meaning.

In some embodiments, the remote server may compute an average of the input received from the users to determine whether a majority of the users liked or disliked the action. The remote server may associate the player action with a high rank (e.g., a rank that corresponds to a reward) when the majority of the users liked the action and associate the player action with a low rank (e.g., a rank that corresponds to a penalty) when the majority of the plurality of users disliked the action. In some implementations, the remote server may associate a high/low rank with the player action based on whether the player completed or failed to complete a level or a section of a level within the interactive video gaming environment.

The remote server may determine based on the rank associated with the received player action, whether the rank corresponds to a reward or a penalty. The remote server may select one of the media assets received from the users based on whether the rank associated with the player action corresponds to the reward or the penalty. In particular, when the rank corresponds to the reward, one of the media contents categorized as a reward is selected and when the rank corresponds to the penalty, one of the media assets categorized as a penalty is selected. The remote server may transmit one of the selected media assets to the player for display as a reward or a penalty. In some embodiments, the remote server may select for transmission to the player a media asset having a measure of quality greater than another media asset as a reward instead of transmitting a media asset categorized as a reward. Similarly, the remote server may select for transmission to the player a media asset having a measure of quality lower than another media asset as a penalty instead of transmitting a media asset categorized as a penalty.

In each case, discussed above and below, where the remote server transmits the media asset as a reward or penalty to the user, instead of transmitting the entire contents of the media asset as the reward or penalty to the user, the remote server may transmit a communication that includes a link to the media asset. The user may select the link and navigate to a location (e.g., local storage location or remote storage location on another server) to retrieve the contents of the media asset.

In some embodiments, the remote server may transmit, to the player as a reward, a media asset segment (e.g., a 5 second clip) that represents a portion of a video media asset following a current playback position of the player in the video media asset. Similarly, the remote server may transmit, to the player as a penalty, a media asset segment (e.g., a 5 second clip) that represents a portion of the video media asset that is previous to the current playback position of the player in the video media asset.

In some embodiments, after selecting a media asset and before transmitting the selected media asset to the user, the remote server may determine whether the player has previously accessed the media asset as a reward or penalty or with the particular measure of quality. When the player has previously accessed the media asset, the remote server may select a different media asset that is categorized the same as the previously selected media asset or is associated with substantially the same measure of quality as the previously selected media asset for transmission to the player in place of the previously accessed media asset.

In some embodiments, the remote server instead of selecting one of the media assets, indicates to the widget of the player equipment whether the action is associated with a high/low rank (e.g., whether the rank corresponds to a reward or a penalty). The widget may then select the appropriate media asset for presentation or display to the player from a local database of stored media assets or links to remotely stored media assets.

In some embodiments, the widget may be an exercise application running on user equipment. When an exercise application runs on user equipment, the user equipment is referred to as exercise equipment. The exercise equipment may be a mobile device (e.g., a mobile phone coupled to a biological attribute monitor such as a heart rate monitor, or sensing circuitry that measures a level of exercise such as a shoe that measures distance the user is running), an exercise machine (e.g., treadmill, bicycle machine, step machine, or any other suitable stand-alone exercise machine), user television equipment such as a set top box that includes or is coupled to suitable circuitry for monitoring biological attributes or sensing circuitry for measuring a level of exercise, or any other suitable device capable of running an exercise application.

In some implementations, a widget may monitor or continuously monitor a length of time the user is using the exercise equipment. The widget may determine whether the length of time exceeds a predetermined exercise threshold (e.g., whether the user has run for longer than one mile). The widget may select a media asset for playback (displaying or sounding) to the user based on whether the length of time exceeds a predetermined exercise threshold. For example, the widget may provide or display a media asset having a first measure of quality when the length of time does not exceed the predetermined exercise threshold. The widget may provide or display another media asset having a second greater measure of quality when the length of time exceeds the predetermined exercise threshold. The media assets may be retrieved for display from local storage or from a remote server over a communications network (e.g., the Internet). The first media asset may be a first segment (e.g., a clip) of a sporting event and the second media asset may be a second segment (e.g., a clip) that is later in time in the sporting event or that is longer than the first media asset.

FIG. 1 illustrates an example of a system 100 for providing reward and penalty media based on player action in an interactive video gaming environment (e.g., using a widget 105) in accordance with some embodiments of the present invention. Widget 105 may be resident in user/player entertainment equipment 104 within user/player equipment 108. Alternatively, widget 105 may be resident in user/player internet-enabled equipment 106 within user/player equipment 108. User/player equipment 108 may include both user/player entertainment equipment 104 and user/player internet-enabled equipment 106.

The term "player" refers to the person or viewer performing a particular action or interacting with the interactive video gaming environment (e.g., transmitting a video or media asset for ranking). The term "user" or "users" refers to other players, viewers or persons that contribute to game play of the player in the interactive video gaming environment (e.g., ranking a video or media asset received from the player). The player can sometimes become a user when the player is contributing to game play of another one of the users. The player and the users may communicate, perform and receive each other's actions or contributions in the interactive video gaming environment system 100. In particular, each player or user may be associated with particular user/player equipment 108 that executes or accesses the interactive video gaming application (e.g., using widget 105 or using a computing device that accesses a website on the Internet).

Widget 105 may be a software application that is downloaded or installed, for instance, in user/player entertainment equipment 104. Widget 105 may be executed by an interpreter or virtual machine running, for example, on control circuitry of user/player entertainment equipment 104 (e.g., control circuitry 204 of FIG. 2). Widget 105 may allow users to interact with web services while watching television, media assets or other video asset or program on user/player entertainment equipment 104. In some embodiments, widget 105 may run on the Yahoo! Connected TV platform, and user/player entertainment equipment 104 may be a television manufactured with built-in support for widget 105 (e.g., from one of Samsung Group, Sony Group, LG Electronics, or Vizio).

Figure 2:
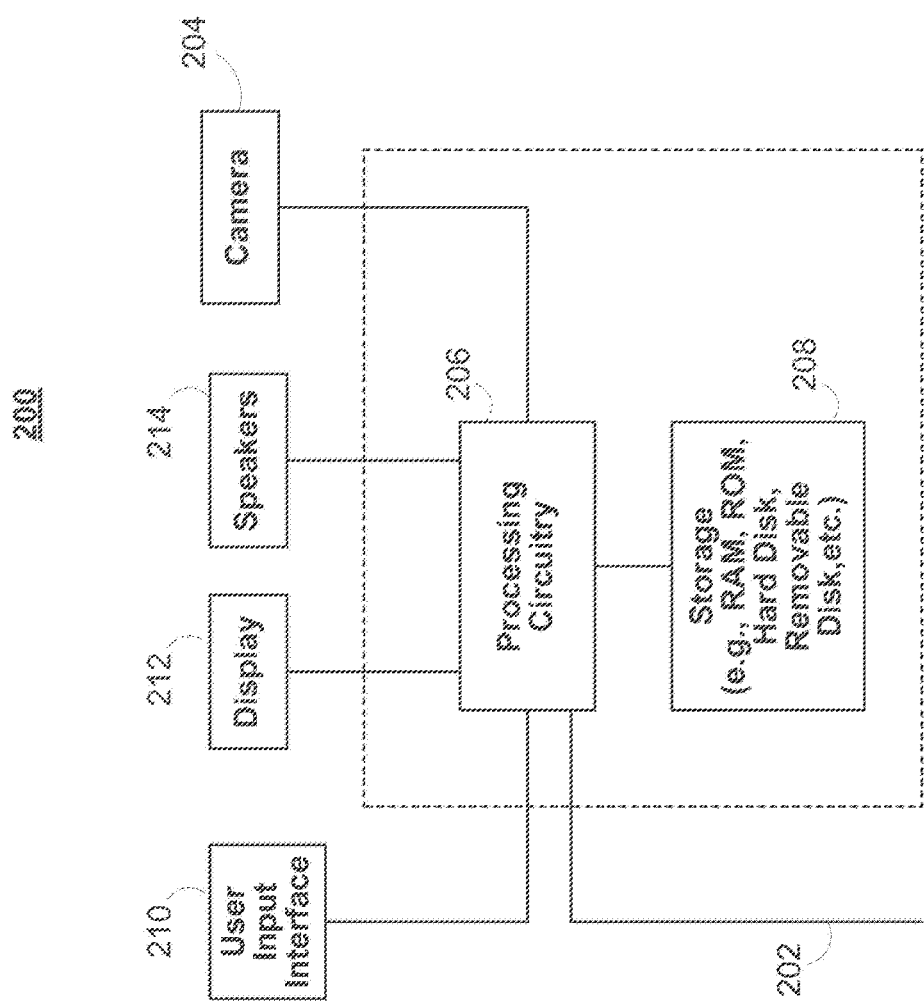
FIG. 2 illustrates an example of a user equipment device that may be used to implement the interactive video gaming environment in accordance with some embodiments of the present invention.

In some embodiments, widget 105 may be packaged and/or encoded in the ETV Binary Interchange Format (EBIF), received by control circuitry 204 of FIG. 2 as part of a suitable feed, and interpreted by a user agent running on control circuitry 204. For example, widget 105 may be an EBIF application and user/player entertainment equipment 104 may be a set-top box. In other embodiments, the widget may be defined by a series of JAVA-based files that are received and run by a local virtual machine or other suitable middleware executed by control circuitry 204 of FIG. 2. In yet other embodiments (e.g., those employing MPEG-2 or other digital media encoding schemes), the widget may be encoded and transmitted in an MPEG-2 object carousel with the MPEG audio and video packets of a program. In this embodiment, widget 105 may be an OCAP widget (e.g., a tru2way widget), and user/player entertainment equipment 104 may be a set-top box.

In other embodiments, user/player entertainment equipment 104 may include user television equipment, user computer equipment, a wireless user communication device, an e-reader, a set-top box, an ipad, a touch screen tablet device, a media equipment device, mobile telephone, or any other type of user entertainment equipment for accessing media, such as a non-portable or portable gaming machine.

In some embodiments, the user may enter settings information, such as user profile information, user login information, and user permissions information, into user/player internet-enabled equipment 106. Assuming that the user sets their permissions such that user profile information may be stored externally, the user profile information may be stored in a remote data store (e.g., one of databases 112). Otherwise, the user profile information may be stored in a data store within user/player equipment 108 (e.g., storage 208 of FIG. 2). User/player internet-enabled equipment 106 may include a set-top box, an integrated receiver decoder (IRD) for handling satellite television, a PC, a laptop, a tablet, an e-reader, a WebTV box, a personal computer television (PC/TV), a PC media server, a PC media center, an ipad, a touch screen tablet device, a mobile telephone, a mobile entertainment device, a media equipment device, a television set, a digital storage device, a DVD recorder, a videocassette recorder (VCR), a local media server, wireless user communications devices, portable exercise equipment, stand-alone exercise equipment or any other suitable internet-enabled or non-internet-enabled equipment. WEBTV is a trademark owned by Microsoft Corp. Wireless communications devices may include PDAs, a mobile telephone, a smartphone, a portable music player, a portable gaming machine, an ipad, a touch screen tablet device, or other wireless devices.

In system 100, there is typically more than one user/player equipment 108 but only one is shown in FIG. 1 to avoid overcomplicating the drawing. In addition, each user may utilize more than one type of user/player equipment 108 (e.g., a user may have a television set and a computer) and also more than one of each type of user/player equipment 108 (e.g., a user may have a PDA and a mobile telephone and/or multiple television sets).

It should be noted that, with the advent of television tuner cards for PC's, WebTV, and the integration of video into other user equipment devices, the lines have become blurred when trying to classify a device as a user/player entertainment equipment 104 or a user/player internet-enabled equipment 106. In fact, in some embodiments, widget 105 may run on user internet-enabled equipment 106 in addition to user entertainment equipment 104, and settings information may be entered using either type of user equipment. Each user equipment 108 may utilize at least some of the system features described below with respect to FIG. 2 and, as a result, include flexibility with respect to the type of interactive applications available on the device. For example, user/player entertainment equipment 104 may be internet-enabled allowing for access to settings information through the Internet, while user/player internet-enabled equipment 106 may include a tuner allowing for access to television programming, and both may run widget 105 together or separately. It should therefore be understood that, in some embodiments, user/player entertainment equipment 104 and user/player internet-enabled equipment 106 are integrated components of a single user device (i.e., user/player equipment 108).

Widget 105 may have the same display layout and/or execution parameters on the various types of user equipment or may be tailored to the display and/or processing capabilities of the user equipment. For example, on user/player entertainment equipment 104, widget 105 may run as a persistent (e.g., always-running) application. In another example, the widget display screens may be scaled down for wireless user communications devices.

In addition to widget 105, user/player equipment 108 may access and/or run a media guidance application that provides an interface that allows users to efficiently navigate through media selections and easily identify media content that they may desire. Media guidance applications may take various forms depending on the media for which they provide guidance. One typical type of media guidance application is an interactive television program guide or interactive media guide. Interactive television program guides (sometimes referred to as electronic program guides or EPGs) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), recorded programs, and other types of media content (e.g., audio content). Moreover, media guidance applications allow users to navigate among and locate content related to the media content for which guidance is provided including, for example, video clips, audio assets, articles, advertisements, chat sessions, games, etc. Media guidance applications may be provided as on-line applications (i.e., provided on a web-site), or as stand-alone applications or clients.

The aforementioned settings information entered by the user may be consistent across in-home devices and remote devices. Settings include those user profile, user login, and user permission settings described herein, as well as media favorites, media guidance settings, display preferences, and other desirable settings. For example, if a user sets a channel as a favorite on, for example, the web site www.tvguide.com on their personal computer at their office, the same channel would appear as a favorite on the user's in-home devices (e.g., in a media guidance application running on user entertainment equipment 104). Therefore, changes in settings made on one user equipment device can change the user's experience on another user equipment device, regardless of whether they are the same or a different type of user equipment device. In addition, the changes made may be based on settings input by a user, as well as monitored user activity (e.g., activity monitored by widget 105).

In some embodiments, user profile information may include data from monitoring a user's activity. For example, user interaction with widget 105, a media guidance application, and/or any other suitable application or feature (e.g., running on or displayed by user/player equipment 108) may be monitored and recorded. User profile information may also include user-identifying information (e.g., the user's name), user viewing habits, user demographic information, or any other suitable data relating to and/or describing a user. User profile information may be stored within user/player equipment 108 and/or at a remote location (e.g., databases 112).

The user equipment devices of user/player equipment 108 may be coupled to communications network 130. Namely, user/player entertainment equipment 104 and user/player internet-enabled equipment 106 may be coupled to communications network 130 using communications paths 133 and 134, respectively. Communications network 130 may be one or more networks including a local area network, a wide area network, the Internet, a mobile phone network, peer-to-peer network, mobile device (e.g., Blackberry) network, cable network, public switched telephone network, or other types of communications networks. BLACKBERRY is a service mark owned by Research In Motion Limited, Corp. Paths 131-141 may separately or together include one or more communications paths, such as, a satellite path, a fiber-optic path, a cable path, a path that supports Internet communications (e.g., TCP/IP, IPTV, etc.), peer-to-peer connections, free-space connections (e.g., for broadcast or other wireless signals), or any other suitable wired or wireless communications path or combination of such paths. Communications with user/player equipment 108 may be provided by one or more of these communications paths, but are shown as single paths in FIG. 1 to avoid overcomplicating the drawing. Communications between multiple user/player equipment 108 may be provided by one or more of these communications paths, but are shown as single paths in FIG. 1 to avoid overcomplicating the drawing or may be handled through an intermediate source, such as outside provider processor 113.

Although communications paths are not drawn between various user/player equipment 108 (e.g., between user/player entertainment equipment 104 and user/player internet-enabled equipment 106), these devices may communicate directly with each other through communications network 130 and/or via short-range point-to-point communication paths, such as USB cables, IEEE 1394 cables, wireless paths (e.g., Bluetooth, infrared, IEEE 802-11x, ZigBee, Radio Frequency for Consumer Electronics (RF4CE), etc.), or other short-range communication or Low-Rate Wireless Personal Area Networks (LR-WPANs) communication via wired or wireless paths. BLUETOOTH is a certification mark owned by Bluetooth SIG, INC. User/player equipment 108 may also communicate with each other indirectly, e.g., through an indirect path via communications network 130.

In some embodiments, widget 105 is invoked expressly by the user, for instance, in response to an indication or selection received from the user (e.g., via user input interface 210 of FIG. 2). In other embodiments, widget 105 is invoked automatically, for example, upon selection or display of a video asset or request to access or use the interactive video gaming environment.

In response to invocation, widget 105 may send information to service provider 102 over communications link 132 and/or to outside provider processor 113 (hereinafter "OPP 113") over communications network 130 (including, e.g., paths 133 and 140). In some embodiments, communications with service provider 102 and OPP 113 may be exchanged over one or more communications paths, but are shown as two separate paths in FIG. 1 to avoid overcomplicating the drawing. In addition, there may be more than one of each of service provider 102 and OPP 113, but only one of each is shown in FIG. 1 to avoid overcomplicating the drawing. As will be described, the information that widget 105 sends to these sources may be as little as an identification number, an indication of the channel or video asset the user is watching, and/or an indication of a particular interactive video gaming environment or action in the interactive video gaming environment selected by the user.

Service provider 102 may include one or more types of media distribution equipment including a television distribution facility, cable system head-end, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Service provider 102 may be the originator of media content, e.g., a television or internet broadcaster, a Webcast or streaming video provider, a digital cable service provider, a bundled communication (e.g., Internet, telephone, and TV) provider such as Verizon FiOS, a provider of digital on-demand media, a cellular telephone service provider, etc. Alternatively, service provider 102 may not be the originator of media content, e.g., an on-demand media content provider, an Internet provider of video content of broadcast programs for downloading or streaming, etc. Service provider 102 may be the central source from which information pertaining to the interactive video gaming environment is received by widget 105 or user/player equipment 108. For example, service provider 102 (e.g., application store) may store the program code (e.g., the application or app) for executing the interactive video gaming environment on a particular user/player equipment 108 (e.g., an iPhone or iPad). The user may be required to purchase the program code to download and access the interactive video gaming environment on user/player equipment 108.

Service provider 102 may include cable sources, satellite providers, on-demand providers, Internet providers, or other providers of media content or interactive video gaming environment. Service provider 102 may also include a remote media server used to store different types of media content (including video content selected by a user, for example, on a website), actions performed by a player in the interactive video gaming environment, or media or videos provided as rewards or penalties by users of the interactive video gaming environment in a location remote from any of the user equipment devices. As used herein, the term broadcaster may refer to an analog or digital signal provider, a cable network, a satellite provider, an Internet website, a cellular telephone network provider, an Internet content provider, or any such provider that may distribute media content such as video assets or interactive video gaming environment information to user/player equipment 108. As used herein, the terms broadcaster's website or media broadcaster's website may refer to one or many web addresses, server addresses, databases, or other sources of media information or media content, specific to a particular broadcaster, and associated with Internet websites or other content providers. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Service provider 102 may also provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips or segments, etc.), on-demand information, and any other type of guidance data that is helpful for a user to navigate among and locate desired media asset selections.

OPP 113 may include a data processor (e.g., any suitable computer server equipment) operated by an outside provider (e.g., the provider of widget 105) that can act as a central hub for communications between widget 105 running on user/player equipment 108, service provider 102, various user/player equipments 108 and third party servers 122. As will be discussed, third party servers 122 may include video asset server 114, player action server 116, media processing server 118, advertisement server 122, and other servers 120. In some embodiments, OPP 113 may store and retrieve information from databases 112. Databases 112 may be any suitable computer server equipment and/or any suitable data storage device.

In some embodiments, OPP 113 may act as a clearinghouse of information for providing data and/or other interactive features to the user of widget 105. To achieve this function, OPP may exchange information with third party servers 122 via communications network 130 and/or communication links 136-140. For example, OPP 113 may receive a video asset from video asset server 114 and provide the video asset to user equipment 108 via communication network 130. Alternatively, user equipment 108 may receive the video asset directly from video asset server 114. As another example, OPP 113 may transmit a request for a video asset or a portion of a video asset (e.g., a specific frame of the video asset) to video asset server 114. Video asset server 114 may fulfill the request by providing the video asset or portion of the video asset to the OPP 113 via communications network 130. Alternatively, video asset server 114 may fulfill the request by providing the video asset or portion of the video asset to the OPP 113 from databases 112 via communications network 130.

In some embodiments, OPP 113 may receive, from user/player equipment 108, a player action relating to game play in the interactive video gaming environment. OPP 113 may store the receive player action in player action server 116. OPP 113 may make available the player action stored in player action server 116 to users of other user/player equipment 108 for ranking the player action. For example, OPP 113 may receive a request from a user to rank player actions. In response, OPP 113 may retrieve one or more player actions from player action server 116 and transmit the retrieved player actions to the requesting user for ranking. In some implementations, OPP 113 may receive a request from a user to upload, store or provide a media asset to video asset server 114 (e.g., as a reward or a penalty video or media asset). OPP 113 may determine whether the requesting user has ranked a predetermined number of player actions before allowing the user to submit the media asset. In particular, OPP 113 may retrieve from player action server 116 (either randomly or on a last recently stored basis) a predetermined number of player actions for provision to the requesting user for ranking. After the user ranks the retrieved player actions, OPP 113 may forward the media asset received from the user to video asset server 114 for storage or provision to another player.

In some implementations, OPP 113 may generate a ranking for the player action based on known or expected responses or player actions, or based on player actions received from other players. For example, OPP 113 may retrieve from databases 112 an expected player action based on a state of game play of the interactive video gaming environment the player is in. In particular, OPP 113 may receive from user/player equipment 108 with the player action information identifying state of game play in the interactive gaming environment (e.g., a level in the game, position in the game or any other suitable information relating to game play). OPP 113 may compare the received player action with the expected response to associate a high/low rank with the player action. In some embodiments, OPP 113 may compare the received player action with player actions received from other players to determine whether the player action is similar to a majority or minority of the other player actions. OPP 113 may associate the received player action with a high/low rank based on whether the rank is substantially similar to the majority (e.g., associate a high rank) or minority (e.g., associate a low rank). OPP 113 may store the rank associated with the player action in databases 112.

In some embodiments, OPP 113 may select a reward or a penalty media asset from video asset server 114 based on the rank associated with the player action. For example, OPP 113 may select a reward media asset when the player action is ranked high and select a penalty media asset when the player action is ranked low. OPP 113 may transmit a selected one of the media assets from video asset server 114 to user/player equipment 108 as the reward or penalty for display to the player. OPP 113 may transmit together or separately from the media asset to user/player equipment 108 information indicating the level of the rank associated with the player action for display to the player.

In some embodiments, OPP 113 may receive from user/player equipment 108 an indication as to whether a length of time a user has exercised or used exercise equipment exceeds a predetermined exercise threshold. OPP 113 may select a media asset from video asset server 114 based on the indication. For example, OPP 113 may select a media asset associated with a first measure of quality from video asset server 114 when the length of time does not exceed or fails to exceed the predetermined exercise threshold. Moreover, OPP 113 may select another media asset associated with a second measure of quality that is greater than the first measure of quality from video asset server 114 when the length of time exceeds the predetermined exercise threshold. In some implementations, OPP 113 may determine whether the length of time exceeds the predetermined exercise threshold by retrieving an exercise profile associated with the user from databases 112 and cross-referencing information about a current state of exercise of the user with information in the exercise profile. The exercise profile may include historical exercise information and biological information associated with the user (e.g., height of the user, weight of the user, exercise goals of the user, previously completed or incompleted exercises).

In some embodiments, OPP 113 may host a website associated with the interactive video gaming environment. Player/user equipment 108 may access the website to allow the user or player to submit player actions, access the interactive video gaming environment, submit one or more media assets and/or rank player actions. Any functionality of the applications provided by user/player equipment 108 described herein may be provided in a similar manner by accessing a website online using a web browser or other website accessing application running on user/player equipment 108.

Video asset server 114 may include any suitable computer server equipment capable of broadcasting, storing or delivering media content (e.g., media assets received from various users of the interactive video gaming environment). Such video asset servers may include traditional head-ends, such as television broadcast stations, and may include Internet servers configured to deliver content upon request (e.g., on-demand, streaming content, downloadable content). For example, a media asset server may be one belonging to Blockbuster Video, Hulu, Netflix, Apple iTunes, or Amazon.com. In some embodiments, video asset server 114 may send inventory and other information to OPP 113 via communications network 130. For example, video asset server 114 may send OPP 113 information regarding media content available via video-on-demand or digital download. The inventory information may be provided, for example, to a media guidance application on user equipment 108. The inventory may include information identifying all or some of the media assets available on video asset server that are provided by users or players of the interactive video gaming application (e.g., using user/player equipment 108). In some embodiments, video asset server 114 may be instructed by OPP 113 to enable a user of one user/player equipment 108 to directly or indirectly connect with a player of another user/player equipment 108 to allow real-time or direct streaming of a media asset (e.g., video asset) from user/player equipment 108 of the user to user/player equipment 108 of the player.

Video asset server 114 may store multiple copies of a particular video asset or media asset where each video asset or media asset copy is associated with a different measure of quality. For example, video asset server 114 may store multiple copies of a video asset where the measure of quality of each copy includes different image qualities, aspect ratios, picture resolutions. Video asset server 114 may associate a class (or set) of videos with a first measure of quality and may associate another class (or set) of videos with a different second measure of quality. The measure of quality of the first class (or set) may be greater than the second class (or set) in that the first class or set may be videos that are longer, more popular among a community, have better content quality, are more original, are better quality, have a greater aspect ratio, have a greater picture resolution or are more rare.

Player action server 116 may include any suitable computer server equipment capable of storing or receiving a media asset, image, video, text, or audio, or any combination thereof. Player action server 116 may receive from user/player equipment 108 an action provided by a player during game play in the interactive video gaming environment. For example, user/player equipment 108 may receive from a player or create a video and may transmit the video to player action server 116. Player action server 116 may communicate with OPP 113 to allow users of user/player equipment 108 in the interactive video gaming environment to access the received video or action and provide a rating for the video (e.g., the player action). Player action server 116 may receive and compile (e.g., compute an average of) ranks received from users of user/player equipments 108 and associate the compiled ranks with the action received from the player. Player action server 116 may communicate with databases 112 to retrieve user profile information and other relevant data for receipt and storage of a player action. In addition, player action server 116 may communicate with databases 112 to store and associate a compiled rank with a received player action. Player action server 116 may be queried through OPP 113 or directly by user/player equipment 108 to retrieve and provide the player with the compiled rank. Alternatively, user information may be provided to player action server 116 from OPP 113 or widget 105. Player action server 116 may include, for example, a repository of player images, videos, audio or other media content. In some embodiments, player action server 116 is the same server as video asset server 114 and/or media processing server 118. Player action server 116 may receive as the action a video from the player as part of the game play, a response to an inquiry or question provided during the game play, an indication that the player completed a segment or stage of the interactive video gaming environment, or an indication that the player reached or failed to reach a segment of one of the plurality of levels of the interactive gaming environment.

In some embodiments, player action server 116 may cross-reference a received player action with known or expected actions to assign a rank or rating to the received player action. For example, player action server 116 may receive from user/player equipment 108 as the player action, an answer to a question provided during game play of the interactive video gaming environment. Player action server 116 may compare the received answer with a correct answer to determine whether the received answer is correct. Player action server 116 may assign a high rank or the highest rank possible when the answer is correct or alternatively, may assign a low rank or a lowest rank possible when the answer is incorrect. Similarly, player action server 116 may compare the received answer with answers to the same or similar question received from other users in the interactive video gaming environment to determine whether the received answer from the player is the same or corresponds to a majority of the answers provided by the other players or not. Player action server 116 may assign a high rank or the highest rank possible when the answer is the same or corresponds to the majority of answers or alternatively, may assign a low rank or a lowest rank possible when the answer is not the same or does not correspond to the majority of answers.

Advertisement server 122 may include any suitable computer server equipment capable of storing and selecting advertisements (e.g., image, video or audio content) that promote an interactive video gaming environment. The interactive video gaming environment being promoted may be different from the interactive video gaming environment being used or accessed by the player (e.g., a different game may be promoted (currently available or that may become available in the future) and may be owned by the same entity as the entity that owns the game being played by the player). The advertisement may promote other features of the interactive video gaming environment (e.g., upgrades, new content or video downloads, etc.), media, pay-per-view media assets, video on-demand media assets, television programming, Internet content, tangible and intangible products, or other suitable information. Advertisement server 122 may be capable of selecting an advertisement that is of a particular length, has particular content or is otherwise related or unrelated to a player action or video asset that is selected for delivery to a player or user. Advertisement server 122 may store in databases 112 an association between different levels of game play in the interactive gaming environment and advertisements. Advertisement server 122 may select an advertisement based on the association in databases 112 and the level in the game play in which the action is received from the player. In some implementations, each of the levels in the interactive video gaming environment is ordered based on increasing levels of difficulty in the interactive video gaming environment.

Media processing server 118 may include any suitable computer server equipment capable of processing player actions, video assets and advertisements provided respectively from player action server 116, video asset server 114, and advertisement server 122. Processing may include combining player actions with advertisements stored in advertisement server 122 and combining video assets with advertisements stored in advertisement server 122. For example, media processing server 118 may be instructed by OPP 113 to place an advertisement (e.g., video, audio or image) before or at some specified time during playback of the content of a player action or video asset so that when the player action or video asset is transmitted for playback to the player or user, the advertisement is displayed before or at some point during the player action or video asset. Similarly, media processing server 118 may be instructed by OPP 113 to place the advertisement (e.g., video, audio or image) within the content of a player action or video asset so that when the player action or video asset is transmitted for playback to the player or user, the advertisement is displayed simultaneously with the player action or video asset (e.g., in an opaque, transparent, or partially transparent overlay). Media processing server 118 may also transcode or convert media assets received from one user using one type of media equipment device (e.g., a set-top box) to a form suitable for playback on a different type of media equipment device (e.g., an iPad, a tablet device, or touch screen interface device).

Media processing server 118 may provide the processed player actions, video assets and advertisements to widget 105 on user equipment 108 (e.g., through OPP 113). It should be understood that, in some embodiments, media processing server 118 may be the same server as server 114, 122 and/or 116. Media processing server may also communicate with other servers 120, the latter of which may perform some or all of the processing steps.

Other servers 120 may include any suitable computer server equipment not mentioned in the description above. For example, other servers 120 may include image or video processing web sites or applications. In some embodiments, other servers 120 may transmit information to OPP 113 or to widget 105 (on user equipment 108) via network 130.

In some embodiments, video asset server 114, player action server 116, media processing server 118, advertisement server 122 or other servers 120 may respond to requests from OPP 113 to process player actions and/or receive and store user media assets (e.g., videos).

FIG. 2 illustrates an example of generalized user equipment 200 that may be used to implement widget 105 and/or all or a portion of the interactive video gaming environment in accordance with some embodiments of the present invention. User equipment 200 may be substantially the same as, or may be comprised within, user/player equipment devices 104 and 106 of FIG. 1, or user/player equipment 108. User equipment device 200 may receive and send information from service provider 102 and/or OPP 113 (FIG. 1) via input/output (hereinafter "I/O") path 202. I/O path 202 may provide data to control circuitry 204, which may include processing circuitry 206, camera 204, and storage 208. I/O path 202 may connect control circuitry 204 (and specifically processing circuitry 206) to communications network 130 of FIG. 1. I/O functions may be provided by one or more communication paths, but are shown as a single path in FIG. 2 to avoid overcomplicating the drawing.

Control circuitry 204 may include any suitable processing circuitry 206 such as processing circuitry based on one or more microprocessors, microcontrollers, digital signal processors, programmable logic devices, etc. In some embodiments, control circuitry 204 executes instructions for widget 105 and/or other applications stored in memory (i.e., storage 208). In client-server based embodiments, control circuitry 204 may include communications circuitry suitable for communicating with networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (described in more detail in connection with FIG. 1). In addition, communications circuitry may include circuitry that enables peer-to-peer communication between user equipment devices 200, or communication between user equipment devices 200 located remotely from each other (described in more detail in connection with FIG. 1).

Memory (e.g., random-access memory, read-only memory, or any other suitable memory), hard drives, optical drives, flash drives, optical storage device, or any other suitable fixed or removable storage devices (e.g., DVD recorder, CD recorder, video cassette recorder, or other suitable recording device) may be provided as storage 208 that is part of control circuitry 204. Storage 208 may include one or more of the above types of storage devices. For example, user equipment device 200 may include a hard drive for a DVR (sometimes called a personal video recorder, or PVR) and a DVD recorder as a secondary storage device. Storage 208 may be used to store various types of media and data described herein, including program information, widget settings, user preferences or profile information, media assets, video assets, player actions, states within the interactive video gaming environment for one or more users, or other data used in operating widget 105 and/or user/player equipment 208. Nonvolatile memory may also be used (e.g., to launch a boot-up routine and other instructions).

Control circuitry 204 may include video generating circuitry and tuning circuitry, such as one or more analog tuners, one or more MPEG-2 decoders or other digital decoding circuitry, high-definition tuners, or any other suitable tuning or video circuits or combinations of such circuits. For example, control circuitry may include a display driver for driving display 212, any number of buffers (e.g., to hold data to be displayed), and/or switching circuitry (e.g., to select which buffer contains the data to be displayed and/or which buffer should be read by the display driver). Encoding circuitry (e.g., for converting over-the-air, analog, or digital signals to MPEG signals for storage) may also be provided. Control circuitry 204 may also include scaler circuitry for upconverting and downconverting media into the preferred output format of the user equipment 200. Control circuitry 204 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive data for widget 105. The circuitry described herein, including, for example, the tuning, video generating, encoding, decoding, scaler, switching, display driver, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc). If storage 208 is provided as a separate device from user equipment device 200, the tuning and encoding circuitry (including multiple tuners) may be associated with storage 208.

A user may issue commands to the control circuitry 204 using user input interface 210. User input interface 210 may be any suitable user interface, such as a remote control, mouse, trackball, keypad, keyboard, touch screen, touch pad, stylus input, joystick, voice recognition interface, or other user input interfaces. Display 212 may be provided as a stand-alone device or integrated with other elements of user equipment device 200. Display 212 may be one or more of a monitor, a television, a liquid crystal display (LCD) for a mobile device, light emitting diode (LED) display, plasma display, or any other suitable equipment for displaying visual images. In some implementations, display 212 may be the same device as user input interface 210 (e.g., when user equipment device 200 includes a touch screen interface). Display 212 may include multiple display screens (e.g., one of the front of user equipment device 200 and one of the back of user equipment device 200). In some embodiments, display 212 may be HDTV-capable. Speakers 214 may be provided as integrated with other elements of user equipment device 200 or may be stand-alone units. The audio component of videos and other media content displayed on display 212 may be played through speakers 214. In some embodiments, the audio may be distributed to a receiver (not shown), which processes and outputs the audio via speakers 214.

In some embodiments, user equipment device 200 may include camera 204 which may be capable of capturing high-definition (e.g., HD, SD), three-dimensional (3D), or any other suitable video and/or image content. In the case of 3D video or image capture, camera 204 may include multiple lenses or multiple cameras spaced apart a predetermined distance to capture stereoscopic images that, when viewed by a user with a stereoscopic optical device, appear in 3D. Processing circuitry 206 may activate camera 204 upon receiving a user instruction through user input interface 210. Camera 204 may be used to create media content and store the media content in storage 208. In some implementations, camera 204 may be used to transmit live or real-time video and/or audio from a user/player to another user/player. In such circumstances, storage 208 may be avoided by camera 204 or may be used as a buffer to time delay the media content captured by camera 204 before transmitting the media content to another user/player.

Camera 204 may be a front-facing camera that is placed within display 212. This allows the user to face camera 204 while viewing display 212. In some embodiments, camera 204 may include two cameras, one on a front panel of user equipment device 200 and one on a back panel of user equipment device 200. The camera on the front panel of user equipment device 200 may be the front-facing camera that is within display 212 that can take images of the user while the user interacts with display 212. The camera on the back panel of the user equipment device 200 may take images of the user when the user turns user equipment device 200 over and front panel display 212 away from the user.

User equipment device 200 may be a representation of, or implemented within, user equipment 108 of FIG. 1, and may thus run widget 105. Accordingly, camera 204 may be used and/or activated by widget 105. Although OPP 113, service provider 102, databases 112 and servers 122 are drawn separately, they may all be housed in a single device at a single geographical location, multiple devices at the same or different geographical locations and/or on a single integrated circuit coupled to communications network 130.

Figure 3A:
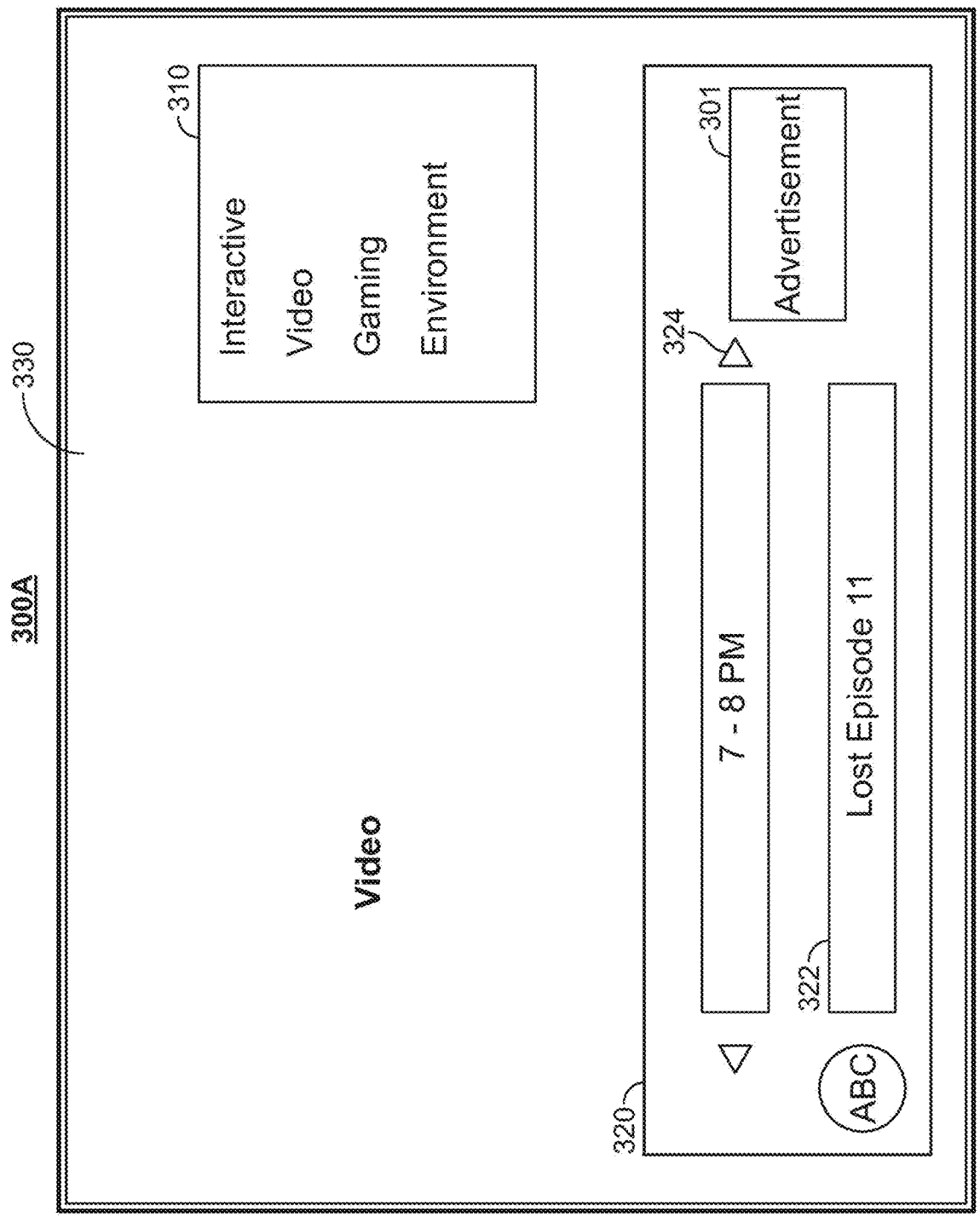
FIGS. 3A-C illustrate exemplary user interfaces that may provide the interactive video gaming environment on various platforms of a user equipment device in accordance with some embodiments of the present invention.
Figure 3B:
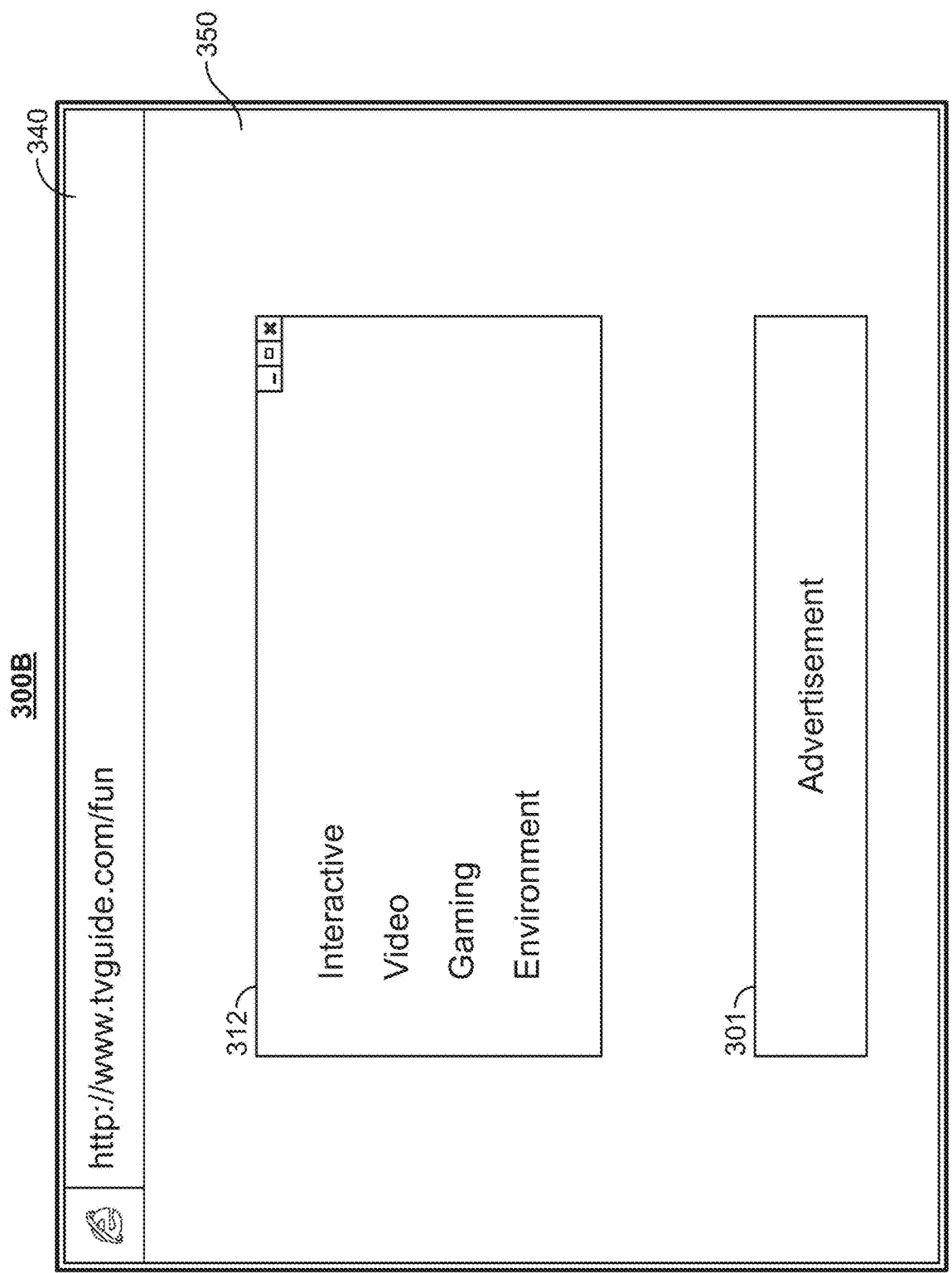
Figure 3C:
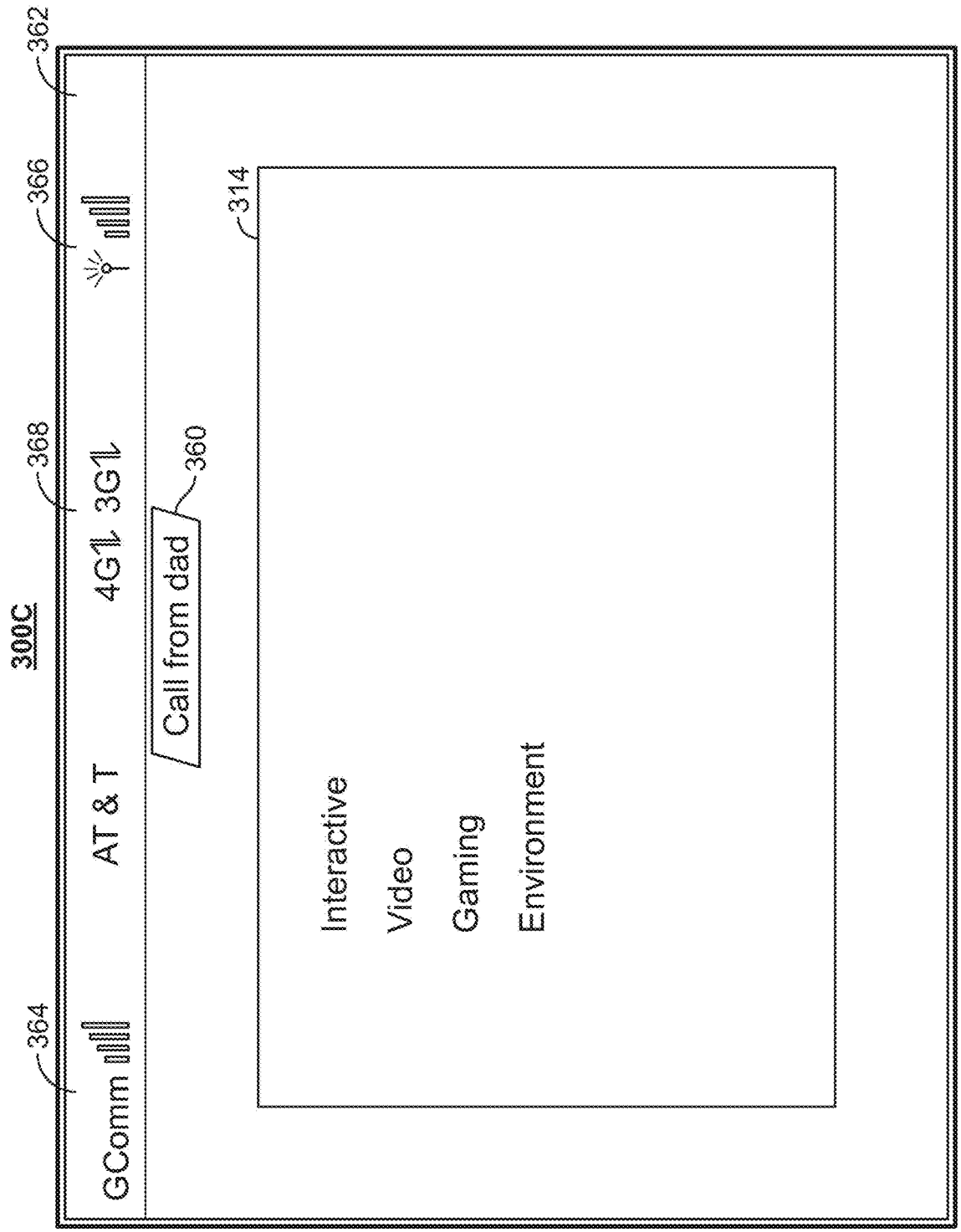

FIGS. 3A-C show illustrative display screens on various platforms that may be used to provide access to an interactive video gaming environment in accordance with an embodiment of the invention. In particular, FIG. 3A shows an illustrative display screen 300A of an interactive video gaming environment running on user equipment device 200. Display screen 300A may be provided by display 212 and may include a video (e.g., a television program or media asset) in a main portion 330 of the display, a browse overlay 320 and a widget display 310 that provides access to the interactive video gaming environment. Widget display 310 may include any of the screens of the interactive video gaming environment that the widget may generate such as the screens shown and described in connection with FIGS. 4-8.

User equipment device 200 may be a television equipment device that includes a tuner or network communications interface to access media assets (e.g., television programs or videos of programming). The tuner may be instructed by a user to tune to particular channels and display, as the video display on main portion 330, the video on the given channel. The channel may be a website or portal to a server on the Internet or other network that transmits media content. In such circumstances, the website or server may transmit the content at scheduled time intervals so that a user knows what content to expect and at what time. Network communications interface may allow the user to browse the Internet and download or stream as video on main portion 330 a media asset from a website on the Internet. In particular, video 330 may be any media asset such as a television program, a video asset, audio asset, multimedia asset, pay-per-view media asset, on-demand media asset, streaming media asset, website, page of an e-book, or any other content suitable for display on display 212 of the user equipment device 200.

Processing circuitry 206 may receive a user request to browse for other media assets (e.g., program listings) and in response may retrieve from storage 208 a media asset that is currently available or will be available in the future. Processing circuitry 206 may display overlay 320 simultaneously with video on main portion 330 to allow the user to see the media assets that are currently available and that will become available in the future. For example, overlay 320 may include a time bar 324 that informs the user about when a given media asset is available and from what source (e.g., when the program is scheduled for broadcast on a given channel such as a television channel or station). Overlay 320 may also include a title 322 and any other information that uniquely identifies the media asset. Processing circuitry 206 may receive a user selection to view detailed information about the media asset in overlay 320, schedule a reminder or a recording for the media asset in overlay 320 or tune to or access the media asset in overlay 320. The media asset displayed in overlay 320 may be the same as the media asset displayed in video 330 or may be different. In particular, overlay 320 may provide information about the currently viewed media asset shown as video in main portion 330 or about a media asset available through another source and/or at a different time.

In some embodiments, widget display 310 may be displayed simultaneously with video on main portion 330 and overlay 320. Widget display 310 may occupy a larger portion of the screen than video 330, a smaller portion, or an equal portion as video 330. Processing circuitry 206 may receive a user input to interchange video 330 with widget display 310. In response to the user input, processing circuitry 206 may display widget 310 in the position where video on main portion 330 was on the screen and video 330 in the position on the screen where widget 310 was displayed.

In some implementations, widget display 310 may be displayed in full screen view when processing circuitry 206 receives a user command to display the interactive video gaming environment on the full screen of the user television equipment. For example, widget display 310 may be displayed in full screen view when the user highlights the region of widget display 310 and presses a SELECT key or when the user through the touch screen of user equipment device 200 touches the region of widget display 310.

In some embodiments, the user may control the video displayed as video on main portion 330 on user equipment device 200 with a first user input interface 210 (e.g., a remote control or touch screen) and may interact with the interactive video gaming environment displayed in widget display 310 using a second user input interface 210 (e.g., a joystick, camera, mouse pad, voice command, gaming remote control, mobile phone, mobile device, touch screen, or other suitable interface). In some embodiments, the control of video on main portion 330 and widget display 310 may be performed using a single user input interface 210

(e.g., a remote control with a built-in camera 204 or a touch screen where the video is displayed).

In some embodiments, an advertisement may be received in the interactive video gaming environment through widget 105. In particular, OPP 113 may combine a video received from video asset server 114 with an advertisement received from advertisement server 122 using media processing server 118. The combined media asset may be provided to widget 105 for display to the player as a reward or penalty. In such circumstances or any other circumstance where widget 105 receives an advertisement from the interactive video gaming environment, widget 105 may display the received advertisement separately from the associated video.

For example, widget 105 may instruct processing circuitry 206 to display the advertisement in advertisement region 301 (which may or may not be part of overlay 320). Widget 105 may instruct processing circuitry 206 to display the media content associated with the advertisement (e.g., the video received from video asset server 114 and that is combined with an advertisement received from advertisement server 122) at the same time, after or before the advertisement in widget display 310. In particular, a video received from video asset server 114 may be displayed as a reward in widget display 310 and an advertisement (e.g., an image for a sponsor of the interactive video gaming environment) may be displayed inside of widget display 310 or in advertisement region 301 of the display.

FIG. 3B shows an illustrative display screen 300B of an interactive video gaming environment running on user computer equipment (e.g., personal computer, tablet computing device, iPad, laptop and/or mobile computing device). Display screen 300B may be provided by display 212 and may include main screen content 350 (e.g., web page of a website) in a main portion of the display, an address bar 340 and a widget display 312 (e.g., a pop-up display, or an overlay on top of main screen content 350) that provides access to the interactive video gaming environment. Widget display 312 may include any of the screens of the interactive video gaming environment that the widget may generate such as the screens shown and described in connection with FIGS. 4-8.

The user computer equipment may include a network communications interface to access media assets or Internet content (e.g., websites). Network communications interface may allow the user to browse the Internet and download or stream as main screen content 350 a media asset from a website on the Internet. In particular, main screen content 350 may be any media asset such as a television program, a video asset, audio asset, multimedia asset, pay-per-view media asset, on-demand media asset, streaming media asset, website, page of an e-book, or any other content suitable for display on a display screen of the user computer equipment.

Processing circuitry 206 may receive a user request to access a particular website through address bar 340 and in response may navigate the user to the website and display a web page as main screen content 350. In some implementations, the user may enter using user input interface 210, as the address in address bar 340, the Internet address (e.g., website URL or IP address) of the computer that hosts the interactive video gaming environment (e.g., OPP 113).

In some embodiments, widget display 312 may be displayed simultaneously with main screen content 350. Widget display 312 may occupy a larger portion of the screen than main screen content 350, a smaller portion, or an equal portion as main screen content 350. Processing circuitry 206 may receive a user input to interchange main screen content 350 with widget display 312. In response to the user input, processing circuitry 206 may display widget 312 in the position where main screen content 350 was on the screen and main screen content 350 in the position on the screen where widget 312 was displayed.

In some implementations, widget display 312 may be displayed in full screen view when processing circuitry 206 receives a user command to display the interactive video gaming environment on the full screen of the user computer equipment. In some implementations, display 300B provided on user computer equipment may have all of the same or similar functionality as display 300A provided on user equipment device 200 (e.g., a user television equipment).

FIG. 3C shows an illustrative display screen 300C of an interactive video gaming environment running on mobile phone equipment (e.g., iPhone, iPad, Droid, cellular telephone, mobile IP telephone, satellite telephone, etc.). Display screen 300C may be provided by display 212 and may include a widget display 314 that provides access to the interactive video gaming environment. Widget display 314 may include any of the screens of the interactive video gaming environment that the widget may generate such as the screens shown and described in connection with FIGS. 4-8. Mobile phone equipment may execute or run widget 105 to generate widget display 314 while continuing to run backend or foreground tasks necessary to operate a mobile telephone (e.g., communications with towers and handling, placing and receiving phone calls).

Screen 300C may include a status bar 362. Status bar 362 may include various indicators that inform the user about the status of the mobile phone equipment. In particular, status bar 362 may include a GComm network reception indicator 364, wireless data communications network reception indicator 368 and voice communications network reception indicator 366. Other indicators (not shown) may also be included in status bar 362 such as new message indicator (e.g., e-mail message, voicemail message, MMS message, or SMS message, etc.), WiFi reception indicator, battery power indicator, number of current applications running/suspended, or other suitable indicator. Mobile phone equipment may be equipped with a specialized communications interface (referred to as GComm—gaming communications) that is configured to handle data communications between only widget 104 and interactive video gaming environment. GComm indicator 364 may indicate independently of the cellular communications indicators (e.g., 3G, 4G and voice communications) the reception of the GComm communications interface.

Processing circuitry 206 may process incoming phone calls and alert the user using prompt 360 about an incoming phone call. Prompt 360 may indicate who the call is being received from (e.g., by name, picture, video, audio, IP address or phone number or any combination thereof). Prompt 360 may be displayed as an overlay on top of widget display 314 so as to not interrupt the game play of the player in the interactive video gaming environment. The user may instruct processing circuitry 206 to ignore or accept the call. If the user instructs processing circuitry 206 to accept the call, processing circuitry 206 may suspend execution of widget 105 and minimize widget display 314 and allow the user to handle the call. If the user instructs processing circuitry 206 to ignore the call, processing circuitry 206 may route the call to voicemail and remove prompt 360 from the display.

An illustrative embodiment of the invention in the realm of a particular interactive video gaming environment is described below in connection with FIGS. 4-6. In particular, FIGS. 4-6 describe the invention in the realm of a "Be A Singing Idol" interactive video game (which may be referred to as "the idol game"). In this interactive video game, a player action includes submission of one or more media assets where the player sings or performs some musical piece or act and users respond by providing reward and penalty videos based on whether the users liked or disliked (enjoyed or did not enjoy) the player's action. In particular, a player creates an action and submits the action to a remote server. The remote server makes the action available to other users of the game for ranking that indicates whether the other users liked or disliked the action. After receiving ranks from the other users, the remote server may determine whether the ranks correspond to a reward or a penalty. Based on that determination, the remote server may select a media asset (e.g., a video) that is categorized as a reward or a penalty and provide the media asset for the player.

Although the invention is described in the context of the idol game, the invention may be implemented in any other type of interactive video gaming environment (e.g., a racing video game, a sporting event video game such as a golf or football game, a strategy based video game, games regarding any hobby or interest such as bird watching or exotic dancing, adventure role-playing game, etc.).

For example, in a racing video game, the player action may be a particular design of a course map, movement of a car (e.g., making a car spin in place), or completion of a course map and the users may respond by providing reward and penalty videos based on whether the users liked or disliked (enjoyed or did not enjoy) the player's action. Similarly, in a sporting event video game the player action may be a particular team strategy created by the player during the course of the game; and in a game regarding a hobby such as bird watching, the player action may be a video or image the player creates of a particular kind of bird which users may respond to by providing reward and penalty videos based on whether they liked or disliked (enjoyed or did not enjoy) of the player's action.

Figure 4:
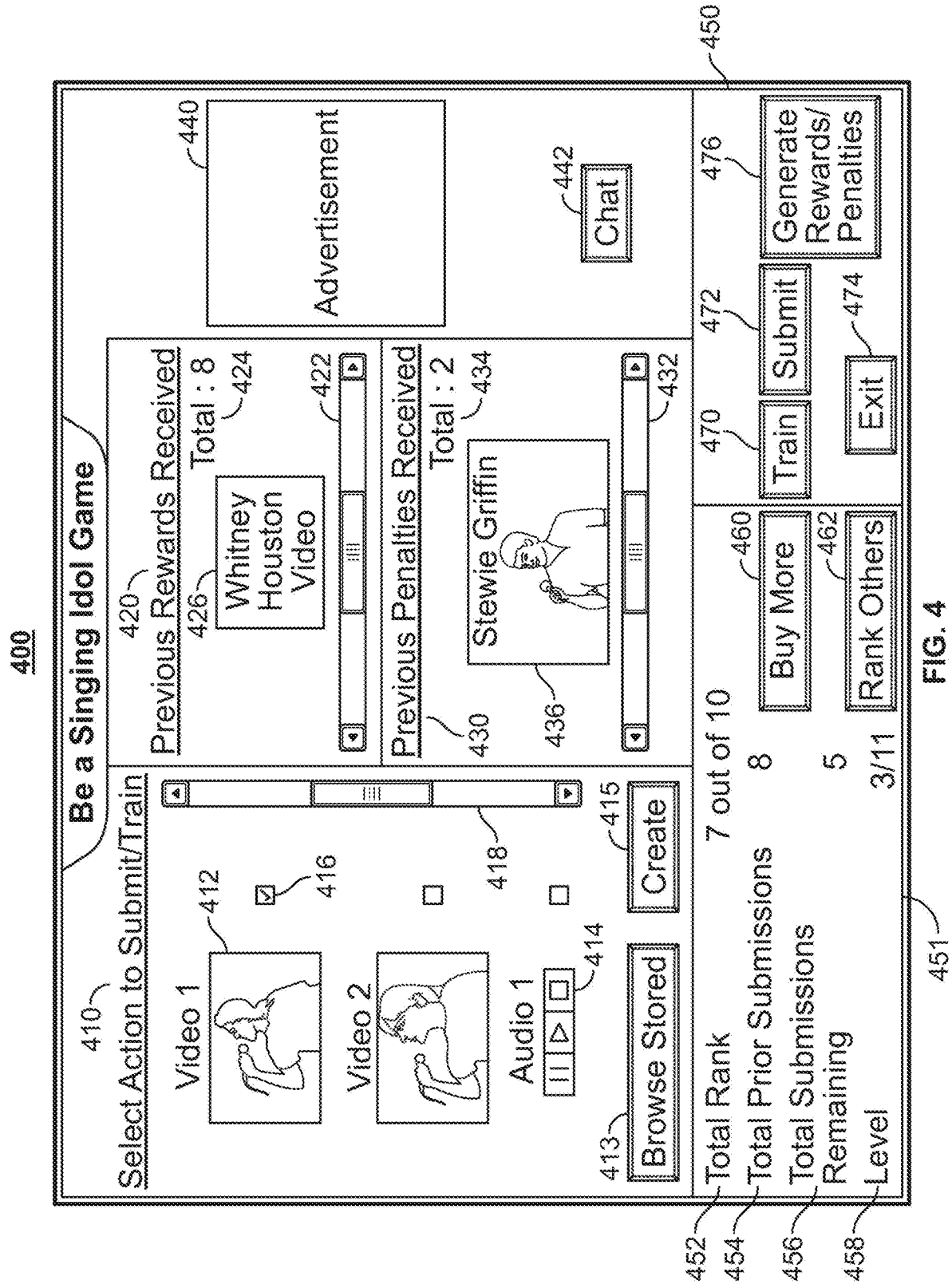
FIGS. 4-6 are illustrative interactive video gaming environment displays in accordance with embodiments of the invention.
Figure 5:
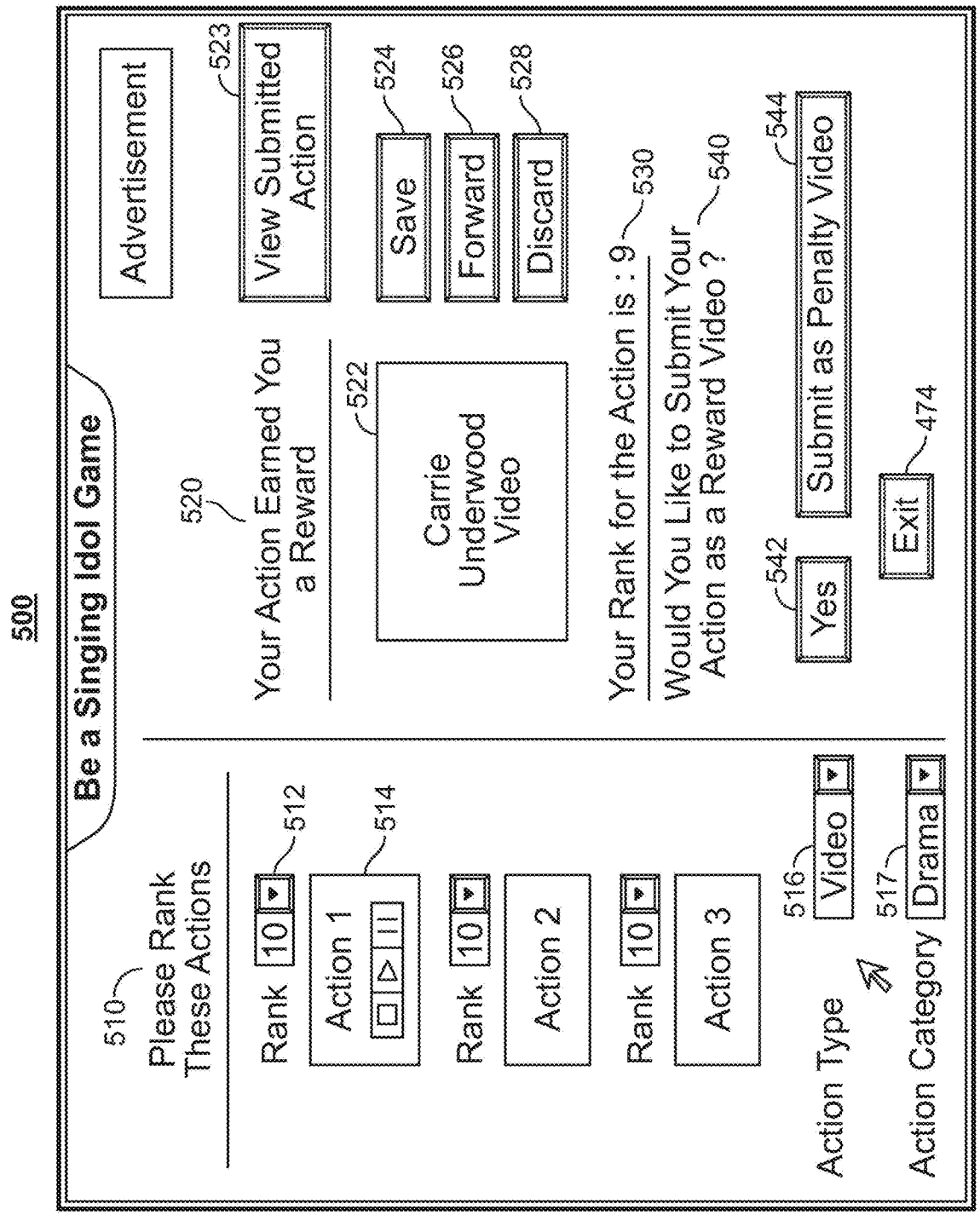

FIG. 4 is an illustrative interactive video gaming environment display 400 in accordance with an embodiment of the invention. In particular, FIG. 4 is an illustrative display of a "Be A Singing Idol" interactive video game. Display 400 may be the initial (or first) navigation screen presented to the user (or player) after the user (or player) Starts up the interactive video gaming environment. This initial navigation screen may be referred to as the "home screen" of the interactive video gaming environment. The home screen may allow the user to select options to instruct processing circuitry 206 to navigate the user or access various features of the interactive video gaming environment.

Display 400 includes an action selection region 410, a previously received rewards/penalties media region 420, options selection region 450 and game status region 451. Although each of the regions is shown in a single display 400, these regions may be broken up into one or more separate displays to accommodate different sized screens on different devices. For example, action selection region 410 may be displayed on one navigation screen of the interactive video game and an option to navigate to one of the other regions (e.g., the options selection region 450, previously received rewards/penalties media region 420, and/or an advertisement region) displayed on a separate screen may be provided with the action selection region 410. Processing circuitry 206 may navigate the user to a screen corresponding to any one of the other regions based on the option selected by the user through a current navigation screen.

An advertisement 440 may be displayed in any navigation screen of the interactive video game. Advertisement 440 may be received from advertisement server 122. Advertisement 440 may inform the player or user about upcoming products and any available upgrades to the interactive video game. Advertisement 440 may be interactive. Processing circuitry 206 may receive a user selection of advertisement 440 and may in response allow the user to purchase the product being advertised. In some implementations, processing circuitry 206 may receive a user selection of advertisement 440 and may in response display additional information for the content or product being advertised or navigate the player or user to a website or navigation page corresponding to advertisement 440.

A chat option 442 may be presented in any one of the navigation screens of the interactive video game. In response to receiving a user or player selection of chat option 442, processing circuitry 206 may provide the user with access to a chat room navigation page. In the chat room navigation page, the user or player may communicate with other users or players of the interactive video game. In some implementations, if a user or player knows the username or identity of another user or player, the user or player may input information that identifies the other user or player and processing circuitry 206 may allow the users to communicate directly with each other.

An exit option 474 may be presented in any one of the navigation screens of the interactive video game. In response to receiving a user or player selection of exit option 474, processing circuitry 206 may save any information or actions created by the player or user and shut down the interactive video game. In some implementations, processing circuitry 206 may transmit a communication to service provider 102 informing service provider 102 that the user or player is leaving the interactive video game. Service provider 102 may use this information to save any information associated with the user or player and prevent communication from any other user or player to the user or player that left. Service provider 102 may save any such communication requests for informing the user or player upon their return to the interactive video game.

In some embodiments, action selection region 410 may allow the player to generate a new action in the interactive video game. For example, in the idol game, the player may generate (or create) the action as a media segment (video, graphic, image, or audio segment) of the player performing (e.g., singing, acting, speaking, or carrying out any form of behavior). The media segment may be of any unlimited length and size but, in some implementations, may be limited by the interactive video gaming environment to a predetermined length or size (e.g., less than 5 minutes long or less than 5 megabytes). In some implementations, the length or size of the media segment may be limited based on the type of media used to create the segment (e.g., less than 5 minutes for a video segment and less than 10 minutes for an audio segment).

For example, processing circuitry 206 may receive a player selection of create option 415. In response to receiving the player selection, processing circuitry 206 may navigate the player to a display that allows the player to create media segment. In particular, processing circuitry 206 may present options for the user asking the player what type of media segment the player would like to create. For example, processing circuitry 206 may present the player with options to create a video, audio, graphic, or any combination thereof. Based on the player selection of the option, processing circuitry 206 may activate the appropriate or necessary input circuitry (e.g., camera 204, user input interface 210, microphone, etc.). Processing circuitry 206 may record (store) the media segment created by the user upon receipt of a player indication that the creation of the segment is complete.

In some implementations, processing circuitry 206 may store the media segment locally in storage 208 of user equipment device 200. In some implementations, processing circuitry 206 may upload and transmit the created media segment to player action server 116 for storage remote from user equipment device 200. Player action server 116 may store an identifier with the received media segment that identifies the player or user equipment device 200 associated with the stored media segment. In some implementations, each player may be allocated a predetermined amount of storage space on player action server 116 which may be used for storing player actions (e.g., media segments created by the player) and any other information pertaining to the interactive video game.

In some embodiments, the action created by the player may be selected for submission or training as part of the interactive video game. For example, action selection region 410 may allow the user to select a previously generated action. Action selection region 410 may include a list of previously generated actions. The list of previously generated actions may include any number of previously generated actions constrained only by the size of display 212. In some implementations, the list may identify each previously generated action by title or any other unique identifier (assigned by the user or automatically generated by user equipment device 200) associated with a given action.

Using a scroll bar 418 displayed in action selection region 410, the player may instruct processing circuitry 206 to display other actions that did not fit in action selection region 410. Scroll bar 418 may be scrolled up or down to show the previous and subsequent previously stored actions, respectively. Processing circuitry 206 may sort and display the previously generated actions in action selection region 410 in an order based on creation date, access date, popularity, size, quality, rank (resulting from being submitted or manually assigned by the player), an alphabetical order of titles, or any other suitable criteria. For example, processing circuitry 206 may display the listings of the previously generated actions in sequence from earliest created action to latest created action. Similarly, processing circuitry 206 may display the listings of the previously generated actions in sequence from highest ranked action to lowest ranked action, where an action that has no rank may be assigned, for sorting, a highest rank so that it is most visible to the player. Processing circuitry 206 may display a sort menu (not shown) in action selection region 410 which the player use to instruct processing circuitry 206 on how to order the listings of the previously generated actions.

In some implementations, each previously generated action may be listed using an image or unique identifier associated with the previously generated action. For example, when the previously generated action is a video segment, a random frame 412 of the video segment (or a frame selected by the user) may be shown within action selection region 410. In some implementations, the previously generated action may be a graphic or an image, and in these circumstances, a thumbnail of the previously generated graphic or image may be depicted on the display within action selection region 410. In some implementations, the previously generated action may be an audio segment, and in these circumstances, audio playback options 414 with a title of the previously generated action may be shown within action selection region 410.

In some embodiments, the player may select, click on, or highlight an area corresponding to where a listing of the action is displayed. In response to receiving the player input (selecting, clicking on, or highlighting), processing circuitry 206 may playback the action where the corresponding listing of the action is shown. For example, when the player selects, clicks on, or highlights frame 412 that corresponds to a video 1 video segment action, processing circuitry 206 may begin playback from the start or other position of the video within the same window in which the frame is shown. Alternatively, processing circuitry 206 may retrieve the corresponding video of frame 412 and display a larger size window as an overlay on display 400 for playback of the video segment. Similarly, when the player selects, clicks on, or highlights audio playback options 414 that corresponds to an audio segment action, processing circuitry 206 may begin playback from the start or other position of the audio segment. The player may pause and stop playback of the audio segment action using audio playback options 414.

The listings of actions displayed in action selection region 410 may correspond to any locally or remotely stored action (e.g., media segment) of the player. In some implementations, processing circuitry 206 may receive a selection of a browse stored option 413. Browse stored option 413 may be selected by the player when the player does not see a listing for an action which was previously created by the player or someone else. For example, an action may have been created on a different user equipment device 200 on another occasion which may not have been synchronized with the information about the previously generated actions stored on user equipment device 200 currently being used by the player. For example, the player may be accessing the interactive video game using a portable device and the listings of the actions may be those that are known to the portable device. The player may have generated an action using a television equipment device which may not have been transferred into storage of the portable device. Accordingly, in response to receiving the player selection of browse stored option 413, processing circuitry 206 may display a menu through which the player may locate actions stored in other devices or locations (e.g., the television equipment device or a portable storage device such as a USB key). Processing circuitry 206 may add a listing for the action retrieved from the browsed location (e.g., the portable storage device) for the player to select for inclusion in the game.

Action selection region 410 may include a selection element 416 (e.g., a checkbox) next to or associated with each displayed action listing. Processing circuitry 206 may receive input from the player selecting one or more actions using each corresponding selection element 416. The actions corresponding to the listings which are selected by the player using, for example, selection element 416 may be submitted to player action server 116 for ranking by users of the interactive video gaming environment. Alternatively, the actions corresponding to the listings which are selected by the player using, for example, selection element 416 may be submitted for training. Processing circuitry 206 may determine whether to submit the selected actions for ranking or training based on whether the user selects submit option 472 or train option 470, respectively. In particular, selection of submit option 472 instructs processing circuitry 206 to enter "game" mode and selection of train option 470 instructs processing circuitry 206 to enter "training" mode.

In training mode, processing circuitry 206 may evaluate each of the selected actions. Processing circuitry 206 may apply a heuristic to automatically assign a rank to each of the selected actions. For example, when one of the selected actions is an audio segment, processing circuitry 206 may analyze the sound profile (e.g., frequency, amplitude, rhythm, harmony (harmonic function), melody, structure, form, timbre, texture, or other sound characteristic of the audio segment) of the audio segment to determine whether it meets a predetermined sound profile. In particular, a plurality of predetermined sound profiles may be stored in storage 208. Each of the predetermined sound profiles may correspond to a particular rank. Processing circuitry 206 may compare the sound profile of the selected action to the predetermined sound profiles to automatically assign a rank to the selected action.

In some embodiments, processing circuitry 206 may display the rank assigned to each of the selected actions and provide feedback to the user to instruct the user how to reach a higher rank. For example, processing circuitry 206 may include a description for each of the selected actions that have been evaluated informing the player what to change that would resemble the next higher ranked predetermined sound profile. In particular, processing circuitry 206 may inform the player about what location or locations had an inconsistent tone or frequency relative to the majority of the tone or frequency in selected audio segment action. A similar analysis and automatic ranking may be performed for each type of action (e.g., video segment, image or graphic).

In game mode, processing circuitry 206 may transmit each of the selected actions to player action server 116. Processing circuitry 206 may communicate and instruction to player action server 116 that the transmitted actions are part of game play in the idol game or interactive video game and are not just for remote storage, as discussed above. Based on the received action and instructions, player action server 116 may make the received actions available to other users of the idol game for ranking. In particular, other users of the idol game may indicate whether they liked or disliked the action submitted by the player by, for example, providing a numerical ranking. In some implementations, the ranking provided by the users may be based on character type, alphabet or any other type of indication that allows player action server 116 to determine whether the users liked or disliked the action. The reward or penalty media asset may be generated by another one of the users of the interactive video game. A discussion of how player action server 116 selects a reward or penalty media asset (e.g., a video segment, audio segment, image or graphic) based on the rank assigned to the action for provision to the player (e.g., for display to the player or storage on user equipment device 200 of the player) is provided below in connection with FIG. 5.

In some embodiments, player action server 116 may determine whether the player is authorized to have the action ranked by other users of the interactive video game before making the action available to the other users for ranking. In some implementations, player action server 116 may determine that the user is authorized based on a level of the player within the interactive video game. For example, a player that is in a higher level of the interactive video game may be authorized to have a greater number of actions ranked in a given period than a lower level of the same game. Player action server 116 may determine whether the user has reached the maximum number of actions submitted in game mode for the level of the interactive video game to determine whether the user is authorized to have another action made available for ranking.

In some implementations, player action server may determine that the user is authorized based on a predetermined number of other player actions the player has previously ranked. For example, a player that has ranked a predetermined number of other player actions may be authorized to submit a predefined number of player actions. There may be a one-to-one correspondence between the number of player actions ranked and the number of actions the player may submit in game mode. Alternatively, the player may be required to rank 10 other player actions before being authorized to submit a single action in game mode.

In some embodiments, game status region 451 may include information that indicates to the user a position within the interactive video game and whether the player is authorized to submit an action in game mode. Game status region 451 may include a total rank indicator 452 which may indicate to the player the player's rank within the interactive video game. The total rank may be computed based on an average of the ranks received for actions previously submitted and ranked in game mode. The total rank may or may not include in the average the ranks automatically determined in training mode. Game status region 451 may include a total prior submissions indicator 454 which indicates to the player the total number of actions that the player has submitted in game mode. Actions submitted during training mode may not be included in this indicator. Game status region 451 may include a total submissions remaining indicator 456 which indicates to the user the total number of actions that the player is authorized to submit in game mode that remain. As discussed above and below, the number provided by indicator 456 may depend on the level of the player in the game, the number of other player actions the player has ranked or any other suitable factor. Game status region 451 may include a level indicator 458 which indicates to the player the level in the interactive video game that the player is in.

In some embodiments, the level may increase as the player's performance improves within the interactive video game. For example, after the player receives a number of ranks that exceed a predetermined value consistently over a given period (e.g., 1 week), the level of the player in the game may increase. Higher levels in the interactive video game may authorize the player to submit more actions for game play. In some implementations, an action submitted by a player in game mode that achieves a given level in the idol game (e.g., level 5 of 8) may be made available exclusively to a group of members for ranking. For example, the action submitted by a player that achieves a given level in the idol game may be made available to professional music artists or expert judges that can provide a more accurate rank for the action. In some implementations, an action submitted by a player in training mode that achieves a given level in the idol game (e.g., level 5 of 8) may be automatically ranked by user equipment device 200 using stricter standards or using a more advanced or complex set of predetermined sound profiles.

In some embodiments, when the player is not authorized (e.g., because the maximum number of actions that the player can submit in game mode has been reached), the player may be presented with a set of options to become authorized. A buy more option 460 and a rank others option 462 may be presented to the unauthorized player. Processing circuitry 206 may receive a player selection of buy more option 460 and in response may allow the user to purchase the authorization to submit a given number of actions. For example, the player may pay service provider 102 ten dollars for the authorization to submit 20 actions in game mode. Processing circuitry 206 may receive a player selection of rank others option 462 and in response may navigate the player to a screen where the player ranks other player actions to receive authorization to submit a given number of actions in game mode. An exemplary navigation screen that includes a rank others region 510 that allows the player to rank other player actions is discussed in connection with FIG. 5 below. In particular, a discussion of how a player or other users of the idol game (users of the interactive video gaming environment) rank the actions made available by player action server 116 is provided in connection with FIG. 5.

In some embodiments, once player action server 116 determines the player is authorized, player action server 116 may automatically rank the action. For example, player action server 116 may determine whether the received action matches a correct action in game play of the interactive video game. Player action server 116 may assign a high valued rank to the action when the received action matches a correct action. Player action server 116 may assign a low valued rank to the action when the received action matches an incorrect action. In particular, the action received from the player may be a particular move in a game or response to an inquiry in the game. Player action server 116 may evaluate the action to determine whether the move in the game or response to the inquiry is correct or incorrect. Player action server 116 may perform this determination by maintaining a database of expected actions or responses associated with a level or position or inquiry of the interactive video game. The discussion above and below for providing media assets as rewards or penalties based on a rank assigned to a player action is applicable to automatically assigned ranks or ranks assigned by other users of the interactive video game (discussed below).

In some embodiments, once player action server 116 determines the player is authorized, player action server 116 may make the action available to other users for ranking. For example, player action server 116 may publish the action on a website and allow other users to view the action and provide a rank for the action. In particular, other users may navigate to a page of the website that allows them to rank player actions. The page may resemble rank others region 510 of FIG. 5. Rank others region 510 may include a number of actions 514 each with a corresponding rank options menu 512. In some implementations, actions 514 may be listed in a same or similar manner as the actions listed in action selection region 410 (FIG. 4), By default, the listed actions 514 may include a mix of action media types (e.g., video actions, audio actions, graphics, or images).

In some implementations, the user may select an option 516 to cause processing circuitry 206 or player action server 116 to only display actions in region 510 of a certain media type (e.g., only display video actions). In some implementations, the user may select an option 517 to cause processing circuitry 206 or player action server 116 to only display actions in region 510 that include certain simple and combination categories of content (e.g., only display comedy actions, drama actions, violence actions, explicit actions, action type actions, any other content category action or combination thereof).

In some embodiments, the actions listed in region 510 may be randomly or pseudorandomly selected by player action server 116 for the user to view and rank. In some implementations, player action server 116 may discard or prevent actions that have already been accessed (viewed) or substantially accessed (viewed) by the user from being listed in region 510. This way the user that is ranking actions may always be presented with new actions to rank and will not provide a rank on multiple occasions for the same action. In some implementations, player action server 116 may maintain a profile for each user of the interactive video game and select the actions that are provided to a given user for ranking based on the profile of the user.

In some embodiments, the user may select one of the displayed actions listed in region 510 for playback. Selection may be performed by highlighting an area corresponding to the action listed (e.g., using a cursor), clicking on the listed action, providing verbal commands, or by any other way using user input interface 210. Processing circuitry 206 may play back, in response to receiving the selection of the listed action, the video or audio of the selected action.

In some embodiments, rank options menu 512 for a given action 514 that is listed may only be enabled or displayed after the user has completely or substantially completely viewed or accessed the displayed action. For example, processing circuitry 206 may monitor whether the selected action has been played back in its entirety or substantially in its entirety (e.g., more than 80 percent) for the user. In response to determining that the action has been played back in its entirety or substantially in its entirety, processing circuitry 206 may enable or display rank options menu 512 to allow the user to submit a ranking for the selected action. The user may select a rank from a range of, for example, one to ten, where one means the user disliked the action and ten means the user liked the action. In some implementations, instead of providing a range of ranks in menu 512, menu 512 may simply include two options (liked or disliked) for the user to select.

Player action server 116 may store the rank assigned by each user for the given action. After a predetermined number of users ranked the given action (e.g., over 100 users ranked the action), player action server 116 may compute an overall rank for the action. In some implementations, player action server 116 may compute the overall rank by computing an average of all the ranks assigned by the users. In some implementations, instead of waiting for the predetermined number of users to rank the action, player action server 116 may continuously compute an average of the ranks after each rank is assigned by a user.

In some embodiments, after a predetermined number of users ranked the given action (e.g., over 100 users ranked the action), player action server 116 may determine whether the rank of the action corresponds to a reward or a penalty. In particular, player action server 116 may determine that the rank corresponds to a reward when the rank exceeds a predetermined threshold and otherwise corresponds to a penalty. In some implementations, player action server 116 may determine that the rank corresponds to a reward when a majority of the users that ranked the action liked the action (e.g., assigned a rank above 6 out of 10). Similarly, player action server 116 may determine that the rank corresponds to a penalty when a majority of the users that ranked the action disliked the action (e.g., assigned a rank below 5 out of 10).

After determining whether the rank of the action corresponds to a penalty or reward, player action server 116 may retrieve a video or media asset from video asset server 114 that is categorized as a reward or penalty based on whether the action rank corresponds to a reward or penalty. For example, the rank corresponding to the submitted action may be determined to correspond to a reward. Accordingly, player action server 116 may be instructed to retrieve a media asset (e.g., a video) from video asset server 114 that is categorized as a reward. When the rank corresponding to the submitted action is determined to correspond to a penalty, player action server 116 may be instructed to retrieve a media asset (e.g., a video) from video asset server 114 that is categorized as a penalty. A detailed discussion of how media assets are generated, stored and categorized as reward or penalty media assets in video asset server 114 is provided below in connection with FIG. 6.

In some implementations, player action server 116 may retrieve a media asset from video asset server 114 by providing an instruction to video asset server 114. The instruction provided to video asset server may include information that identifies the player who submitted the action, includes a user profile of the player, includes a ranking associated with the action, indicates whether to retrieve a reward or penalty media asset, indicates what level within the interactive video game the player is in, indicates an authorization level associated with the player, and/or any combination thereof or other suitable data. Video asset server 114 may have stored a plurality of media assets that are categorized as reward or penalty media assets. Video asset server 114 may retrieve one of the stored media assets based on the instruction received from player action server 114. Video asset server 114 may transmit or provide the retrieved media asset to player action server 116 for provision to the player.

In some embodiments, video asset server 114 may retrieve a reward or penalty video that is of a certain measure of quality based on the level within the interactive video game the player is indicated to be in the instruction received from player action server 116. The measure of quality may include popularity of the content of the media asset (e.g., popularity of a celebrity in the media asset, where the measure of quality is greater for celebrities that are more popular). The measure of quality may include picture resolution, length of the videos, popularity the media asset among a community of users, content quality of the media asset, originality of the media asset, rarity of the media asset, and/or any other suitable value that is attributed to the media asset that can be used to determine whether one media asset is "better" or more valuable than another media asset.

In some implementations, video asset server 114 may retrieve a reward or penalty media asset having a greater measure of quality for higher levels in the interactive video game. For example, video asset server 114 may retrieve a reward or penalty media asset with low image resolution (e.g., 320×240 pixel resolution for still images or 0.25 megabits per second for videos) when the player is indicated to be in the first few levels of the interactive video game. Alternatively, video asset server 114 may retrieve a reward or penalty media asset with high image resolution (e.g., 1280×800 pixel resolution for still images or 1.25 megabits per second for videos) when the player is indicated to be in the last few levels of the interactive video game. In some implementations, video asset server 114 may retrieve a reward or penalty media asset created by an unknown person (e.g., another user of the game) or that has poor or undesirable content when the player is indicated to be in the first few levels of the interactive video game. Alternatively, video asset server 114 may retrieve a reward or penalty media asset created by a celebrity (e.g., Michael Jackson) or that has good or very desirable content when the player is indicated to be in the last few levels of the interactive video game. A similar selection of media assets having particular measures of quality may be performed for any other type of measure of quality discussed above. Increasing the quality of media assets at higher levels may encourage the player to try harder to reach higher levels to attain access to higher quality media assets.

In some embodiments, video asset server 114 may determine that the player is in the last few levels of the interactive video game and that a high quality reward or penalty media asset needs to be retrieved based on that level. Even though a high quality reward or penalty media asset is determined to be needed for retrieval, video asset server 114 may randomly select a low quality reward or penalty media asset for retrieval and transmission to the player. Displaying a low quality reward or penalty media asset to a player that has earned (e.g., because of the level in the video game) a high quality reward or penalty media asset may remind the player about the quality of the media assets in lower levels and discourage the player from performing poorly (e.g., having actions ranked low). Video asset server 114 may determine whether to provide low quality media assets when high quality media assets are earned in a random or pseudorandom manner. Similarly, video asset server 114 may determine that the player is in the first few levels of the interactive video game and that a low quality reward or penalty media asset needs to be retrieved based on that level. Even though a low quality reward or penalty media asset is determined to be needed for retrieval, video asset server 114 may randomly select a high quality reward or penalty media asset for retrieval and transmission to the player. Displaying a high quality reward or penalty media asset to a player that has earned (e.g., because of the level in the video game) a low quality reward or penalty media asset may tease the player and encourage the player to perform better. In particular, displaying a high quality reward or penalty media asset to a player that has earned a low quality media asset may incentivize the player to achieve higher levels in the video game where higher quality media assets are usually provided.

In some embodiments, video asset server 114 may retrieve a reward or penalty video that are of a certain measure of quality based on the rank associated with the action submitted by the player indicated in the instruction received from player action server 116. For example, video asset server 114 may retrieve a reward or penalty media asset having a greater measure of quality for higher ranks associated with the action. For example, video asset server 114 may retrieve a reward or penalty media asset with low image resolution (e.g., 320×240 pixel resolution for still images or 0.25 megabits per second for videos) when the rank is low (e.g., less than 5 out of 10). Alternatively, video asset server 114 may retrieve a reward or penalty media asset with high image resolution (e.g., 1280×800 pixel resolution for still images or 1.25 megabits per second for videos) when the rank is high (e.g., 5 out of 10 or higher). In some implementations, video asset server 114 may retrieve a reward or penalty media asset created by an unknown person (e.g., another user of the game) when the rank is low (e.g., less than 5 out of 10). Alternatively, video asset server 114 may retrieve a reward or penalty media asset created by a celebrity (e.g., Michael Jackson) when the rank is high (e.g., 5 out of 10 or higher).

In some embodiments, video asset server 114 may retrieve a reward or penalty video that is of a certain measure of quality based on the type or package of the interactive video game that the player is using (or has purchased) indicated in the instruction received from player action server 116. For example, video asset server 114 may retrieve a reward or penalty media asset having a greater measure of quality for a player that has purchased or is using an upgraded version of the interactive video game. In some implementations, purchasing the upgrade to the interactive video game may prevent advertisements from being displayed in some or all portions of the interactive video game for the player. The player may use an upgraded version of the interactive video game by providing payment to service provider 102 and downloading the upgrade. In some implementations, the player may only be provided with an option to upgrade to a different version after the player reaches a certain level in the interactive video game. In particular, some upgrade packages may only become available once a player has reached a predetermined level or levels in the interactive video game.

In some implementations, service provider 102 may indicate the version and whether it has been upgraded by the player by storing the indication in the user profile associated with the player. Video asset server 114 may retrieve a reward or penalty media asset with low image resolution (e.g., 320×240 pixel resolution for still images or 0.25 megabits per second for videos) when the player is using an interactive video game without the upgrade. Alternatively, video asset server 114 may retrieve a reward or penalty media asset with high image resolution (e.g., 1280×800 pixel resolution for still images or 1.25 megabits per second for videos) when the player is using an interactive video game with the upgrade. In some implementations, video asset server 114 may retrieve a reward or penalty media asset created by an unknown person (e.g., another user of the game) when the player is using an interactive video game without the upgrade. Alternatively, video asset server 114 may retrieve a reward or penalty media asset created by a celebrity (e.g., Michael Jackson) when the player is using an interactive video game with the upgrade.

In some implementations, video asset server 114 may use the information that identifies the player who submitted the action to determine whether a media asset has previously been provided to the player. In particular, after video asset server 114 selects a media asset for retrieval and provision to the player, video asset server 114 may determine whether that retrieved media asset has previously been provided to the player. Video asset server 114 may store with each media asset, an identifier of each player to whom the media asset has been provided. After selecting a media asset for provision to the player, video asset server 114 may use the information that identifies the player included in the instruction received from player action server 116 to determine whether the selected media asset has previously been provided to the player. When video asset server 114 determines that the media asset has previously been provided to the player, video asset server 114 may select an alternate reward or penalty media asset having the same quality as the previously selected media asset. For example, video asset server 114 may select a penalty media asset having a low measure of quality (e.g., having a 320×240 pixel resolution for still images or 0.25 megabits per second for videos) and determine that the media asset has previously been provided to the player. In response, video asset server 114 may select an alternate penalty media asset having the same measure of quality (e.g., having a 320×240 pixel resolution for still images or 0.25 megabits per second for videos) and provide the alternate media asset to player action server 116 for provision to the player instead.

In some embodiments, video asset server 114 may use settings in the user profile contained in the instruction received from player action server 116 to retrieve a reward or penalty media asset. In particular, video asset server 114 may identify programming (e.g., television programs) that the player enjoys watching using the user profile associated with the player. For example, video asset server 114 may identify that the player enjoys watching episodes of the show "Lost." Video asset server 114 may retrieve a reward or penalty media asset that includes content from the show "Lost" for provision to the player. In particular, video asset server 114 may select a clip (a short segment) of a future episode of the show "Lost" that has not been made publicly available as a reward media asset. Similarly, video asset server 114 may select a media asset clip (a short video or audio segment) of a past episode of the show "Lost" that has not been made publicly available as a penalty media asset. Alternatively, video asset server 114 may select a media asset clip (a short video or audio segment) of an episode (future or past) of programming (e.g., the show "Friends") that the player dislikes based on the user profile as a penalty media asset.

In some embodiments, video asset server 114 may use settings in the user profile contained in the instruction received from player action server 116 and the indication of whether to retrieve a reward or penalty media asset contained in the instruction received from player action server 116 to retrieve a reward or penalty media asset segment that is part of a series of segments of a media asset. In particular, video asset server 114 may store a media asset that is broken up in multiple sequentially continuous segments (e.g., a series that includes 3 segments of the media asset). For example, video asset server 114 may receive a video that is 6 minutes in length and may divide the video into 3 equal 2 minute segments. The segments when played back together make up the entire video. The user profile may include information that indicates which series of segments of a media asset the player has previously seen. Video asset server 114 may use the information in the user profile to determine the position within the media asset up to which the player has accessed. Based on the determination and when the instruction indicates the need for a reward media asset, video asset server 114 may retrieve the segment in the series of segments of the media asset and transmit or provide the retrieved segment to player action server 116 for provision to the player as a reward. Similarly, based on the determination and when the instruction indicates the need for a penalty media asset, video asset server 114 may retrieve any one of the previously submitted segments in the series of segments of the media asset (or a segment of a different media asset series) and transmit or provide the retrieved segment to player action server 116 for provision to the player as a penalty.

The video asset that is retrieved from video asset server 114 may be provided to the player who submitted the action 114 for ranking as a reward or penalty either for immediate consumption (viewing or access) (e.g., in real-time or as a live feed) or after performing further processing using media processing server 118. In some implementations, player action server 116 may establish a peer-to-peer connection between user equipment device 200 of the player and user equipment device 200 of the user who submitted the media asset to be provided to the player as a reward or penalty. Accordingly, the player may be provided with the media asset as a reward or penalty directly from user equipment device 200 of the user who created the media asset.

In some embodiments, media processing server 118 may embed or associate an advertisement from advertisement server 122 into the media asset that is provided to the player as the reward or penalty. The advertisement may be a media asset that includes video, audio, images, or any combination thereof. For example, media processing server 118 may select a suitable advertisement from advertisement server 122 and combine the advertisement with the media asset. In particular, the advertisement may be combined with the media asset by being integrated as an overlay during some portion of the media asset (in the case where the media asset is a video). In some implementations, the advertisement may be combined with the media asset by being appended to the end, beginning, or some middle portion of the media asset so that when the player accessed the media asset, the player is exposed to the advertisement. In some implementations, the advertisement may be selected based on the content of the media asset and type of the media asset.

In some embodiments, media processing server 118 may determine what level of the interactive video game the player is in before selecting the advertisement for inclusion in the media asset. For example, media processing server 118 may determine that the player is in level 8 out of 10 in the interactive video game. Media processing server 118 may determine that no advertisements are provided to players in level 8. Accordingly, media processing server 118 may not incorporate the advertisement into the media asset and may transmit the media asset without the advertisement to the player for consumption (access or viewing).

In some embodiments, media processing server 118 may determine that the player has paid for an access rights to avoid advertisements in the interactive video game. Media processing server 118 may determine that no advertisements are provided to players with such access rights. Accordingly, media processing server 118 may not incorporate the advertisement into the media asset and may transmit the media asset without the advertisement to the player for consumption (access or viewing).

In some embodiments, media processing server 118 may determine the rank associated with the action for which the media asset has been selected and base the advertisement selection on the determined rank. In some implementations, media processing server 118 may determine that no advertisements are provided to players when the rank associated with the action exceeds a predetermined threshold (e.g., the rank is greater than 6 out of 10). Accordingly, media processing server 118 may not incorporate the advertisement into the media asset and may transmit the media asset without the advertisement to the player for consumption (access or viewing). In some implementations, media processing server 118 may select advertisements of a given length based on the rank associated with the action. For example, media processing server 118 may select longer advertisements for actions that are associated with lower ranks and select shorter or no advertisements for actions that are associated with higher ranks. In some implementations, media processing server 118 may avoid incorporating any advertisements into the media asset (exclude advertisements) when the action is associated with a maximum rank.

In some implementations, media processing server 118 may maintain a database for the interactive gaming environment that includes entries that indicate whether to provide an advertisement with the media asset based on a rank. For example, the rank associated with the media assets may range from a value of one to a value of 10. The database may associate less than all of the possible of rank values (e.g., ranks valued from 0 through 6) each with a different advertisement characteristic (e.g., content type, length, value). The database may associate some of the possible rank values (e.g., only the highest rank value) with an indication that no advertisement is to be provided. Media processing server 118 may determine the rank associated with the action and further determine whether to incorporate an advertisement with the media asset provided as the reward or penalty based on the database. In particular, media processing server 118 may cross-reference the received action with one of the entries in the database to identify the rank that corresponds to the received action and which advertisement characteristic is associated with the identified rank. Media processing server 118 may use the advertisement characteristic associated with the rank to select an advertisement (e.g., a longer advertisement for lower ranks or a shorter advertisement for higher ranks) for incorporation with the media asset provided as the reward or penalty for the action. Alternatively, media processing server 118 may use the advertisement characteristic associated with the rank to determine that no advertisement should be incorporated with the media asset provided as the reward or penalty for the action.

Media processing server 118 may provide the media asset that contains the advertisement or that does not contain the advertisement to player action server 116. Player action server 116 may transmit the media asset as the reward or penalty to the player at user equipment device 200. Since there may be some delay from when the player first submits the action in game play and receives a media asset reward or penalty (e.g., ranging from a few days to several weeks), player action server 116 may provide an indication to the player informing the player when the reward or penalty media asset is ready or may provide the player with an estimated time of when the media asset reward or penalty will be ready. For example, player action server 116 may transmit a text message or multimedia message to a mobile device associated with the player indicating the availability of the reward or penalty media asset. In some implementations, the message itself may contain the media asset reward or penalty. In some implementations, the message may provide a link for the player to select to access a website or page that contains the media asset. For example, the player may access a navigation page that includes a reward or penalty media asset retrieval region 520 (FIG. 5) to view or access the reward or penalty media asset. In some implementations, the player may visit or access a navigation page that includes region 520 to determine whether the media asset reward or penalty is ready. In some implementations, the home page of the interactive video game may provide a visual indication informing the user that a newly available reward or penalty media asset is ready. The user may select the visual indication and processing circuitry 206 may navigate the user to a navigation page that includes region 520. In some implementations, processing circuitry 206 may continuously monitor the contents of a navigation page that includes region 520 to automatically determine whether a media asset reward or penalty is available and if so inform the player.

Media asset retrieval region 520 may include a playback display 522 of the media asset received from player action server 116. Playback display 522 may include any visual indication that is associated with and that identifies the media asset to the player. For example, playback display 522 may include a listing with a title of the media asset. Processing circuitry 206 may receive a user selection of the listing and, in response, play back the media asset corresponding to the listing within region 520 or as a separate navigation screen. The media asset displayed in region 520 may be a video, audio, image, graphic, website, or any other content corresponding to the media asset received from player action server 116.

Media asset retrieval region 520 may include a visual or audible indication that informs the player whether the media asset in playback display 522 is a reward or penalty media asset. In some implementations, the indication may be a message, such as "Your Action Earned You a Reward" for reward media assets or "Better Luck Next Time" for penalty media assets. In some implementations, the indication may include a backdrop or displaying a background in region 520 of a certain color (e.g., Green for reward media assets and Red for penalty media assets). In some implementations, the indication may include verbal message generated by user equipment device 200 stating that the media asset about to be played back in display 522 is a reward or a penalty media asset.

Media asset retrieval region 520 may include a view submitted action option 523. View submitted action option 523 may allow the player to be reminded about what action the player submitted that resulted in the reward or penalty media asset displayed in playback display 522. In particular, option 523 may be valuable because the amount of delay between submitting an action during game play and receiving a reward or penalty media asset based on that action may be on the order of days or weeks. Processing circuitry 206 may receive a player selection of option 523 and in response retrieve from local or remote storage the action that was submitted by the player that resulted in the reward or penalty media asset displayed in region 520. Processing circuitry 206 may display the retrieved action in region 520 or in a separate navigation screen.

In some implementations, processing circuitry 206 may generate a short segment or clip (e.g., 10 seconds out of a 1 minute action) of the previously submitted action instead of playing back the entire contents of the action. In some implementations, region 520 may include a message identifying the action that resulted in the reward or penalty media asset by a title or unique image of the action. The title or unique image or visual representation may remind the player about the contents of the previously submitted action (e.g., without selecting option 523).

Media asset retrieval region 520 may include a visual indication 530 of the rank assigned to the previously submitted player action that resulted in the media asset being displayed in region 520. Visual indication 530 may include the overall rank computed by player action server 116 (e.g., the average of all the ranks assigned by other users in the range of 1 to 10). For example, visual indication 530 may be a number ranging from 1-10 representing whether the users of the game liked or disliked the action. In some implementations, instead of (or in addition to) displaying the number corresponding to the rank assigned to the submitted action as visual indication 530, visual indication 530 may include a statement indicating whether the other users liked or disliked the action (e.g., "Users Enjoyed Your Action" or "Users Did Not Enjoy Your Action").

Media asset retrieval region 520 may include a save option 524, forward option 526, and/or discard option 528. In response to receiving a player selection of save option 524, processing circuitry 206 may store the media asset displayed in region 520 in storage 208. In some implementations, processing circuitry 206 may store the media asset displayed in region 520 in a storage device of a remote server, such as other servers 120 in addition to or alternatively to storing the media asset locally in storage 208. Storing the media asset may allow the player to play back the media asset in the future beyond the default availability window which player action server 116 may make the media asset available to the player. In some implementations, the media asset may be stored to a portable device (e.g., an iPad, iPod or other media player) to enable the player to access the media asset independent of service provider 102 (e.g., without accessing the interactive video game).

Referring back to FIG. 4, the player may browse previously received and stored reward media assets and penalty media assets using rewards/penalties media region 420. Rewards/penalties media region 420 may include a separate region for reward media assets (e.g., at the top of region 420) and a separate region 430 for penalty media assets (e.g., at the bottom of region 420).

In some implementations, reward and penalty media assets may be mixed together and displayed as one region in region 420. In such circumstances, processing circuitry 206 may display an option to sort, organize and/or categorize the displayed media assets. For example, processing circuitry 206 may display an option for the player to instruct processing circuitry 206 to only display reward media assets or only display penalty media assets in region 420. Similarly, processing circuitry 206 may display an option for the player to instruct processing circuitry 206 to only display reward and/or penalty media assets that include content of a certain type (e.g., drama, action, comedy, etc.) and/or that are of a certain media type (e.g., video media assets, audio media assets, graphics, website, etc.) and/or that are of a certain quality (e.g., above a certain image resolution or created by a particular source (e.g., a celebrity or user)).

Regions 420 and 430 may include visual identifiers of each reward or penalty media asset displayed in that region. For example, a reward media asset identifier 426 may be displayed in region 420 and a penalty media asset identifier 436 may be displayed in region 430. Identifiers may include program listings, titles of the respective media assets, an image associated with the media asset or any other unique identifier associated with the media asset that identifies the media asset to the player. In some implementations, the identifier displayed in region 420 or 430 may be a picture or image of (or associated with) the user or player that created or submitted the reward or penalty media asset.

Processing circuitry 206 may receive a player selection of any one of the displayed identifiers 426 and 436 and may retrieve the corresponding media asset from local or remote storage. Processing circuitry 206 may play back and display the retrieved media asset in region 420 or 430. Alternatively, processing circuitry 206 may play back and display the retrieved media asset in a separate navigation screen. In some implementations, processing circuitry 206 may navigate the player to screen 500 and play back and display the retrieved media asset in region 520 (FIG. 5).

In response to receiving a player selection of forward option 526, processing circuitry 206 may transmit the media asset to a player or user specified destination over communications network 130. The destination may be a user equipment device 200 associated with another user or player. For example, the player may specify the IP address, e-mail address or other unique information that identifies another user. Processing circuitry 206 may send the media asset to the user based on the information supplied by the player. Accordingly, players may share the media assets they receive with each other. In some implementations, media processing server 118 may add copyright protection information (or other copy or sharing protection) to the media asset before the media asset is provided to the player. In such circumstances, processing circuitry 206 may prevent the display of option 526 and/or prevent the transfer or transmission of the media asset displayed in region 520 to another user/player or device based on the copy protection. Similarly, in such circumstances, processing circuitry 206 may prevent the display of option 524 and/or prevent the media asset displayed in region 520 from being locally or remotely stored for later consumption.

In response to receiving a player selection of discard option 528, processing circuitry 206 may delete the media asset displayed in region 520 from local storage or from a remote storage location available to the player. A confirmation prompt may be presented before the media asset is discarded to prevent accidental selection of option 528 and thereby removal of media asset 522. The player may be required to provide further user input confirming the desire to delete the media asset presented in region 520 before processing circuitry 206 deletes the media asset.

In some implementations, region 420 may include an indication 424 of the total number of reward media assets that are stored and available for the player or user to play back or access. In some implementations, region 430 may include an indication 434 of the total number of penalty media assets that are stored and available for the player or user to play back or access. Scroll bars 422 and 432 may be provided and displayed in regions 420 and 430, respectively. The player or user may use scroll bars 422 and 432 to view indicators or media assets that are stored and available but are not displayed because of limitations of the screen size.

In some embodiments, processing circuitry 206 may organize the penalty and/or reward media assets in regions 420 and 430 based on any suitable criteria. For example, processing circuitry 206 may sort the displayed media assets in an order based on creation date, access date, popularity, size, quality, an alphabetical order of titles, or any other suitable criteria. For example, processing circuitry 206 may display the listings of the previously stored media assets in sequence from lowest quality to highest quality reward or penalty media asset, or the other way around.

In some embodiments, users may generate or create media assets (e.g., videos) for the media assets to be provided to a player as reward or penalty media assets. In particular, in addition to ranking actions created by players, users may also create media assets for provisions to the player as a reward or penalty. Options selection region 450 in the home screen may include a generate rewards/penalties option 476. Processing circuitry 206 may navigate the user to a reward/penalize players screen 600 in response to receiving a user selection of option 476.

Figure 6:
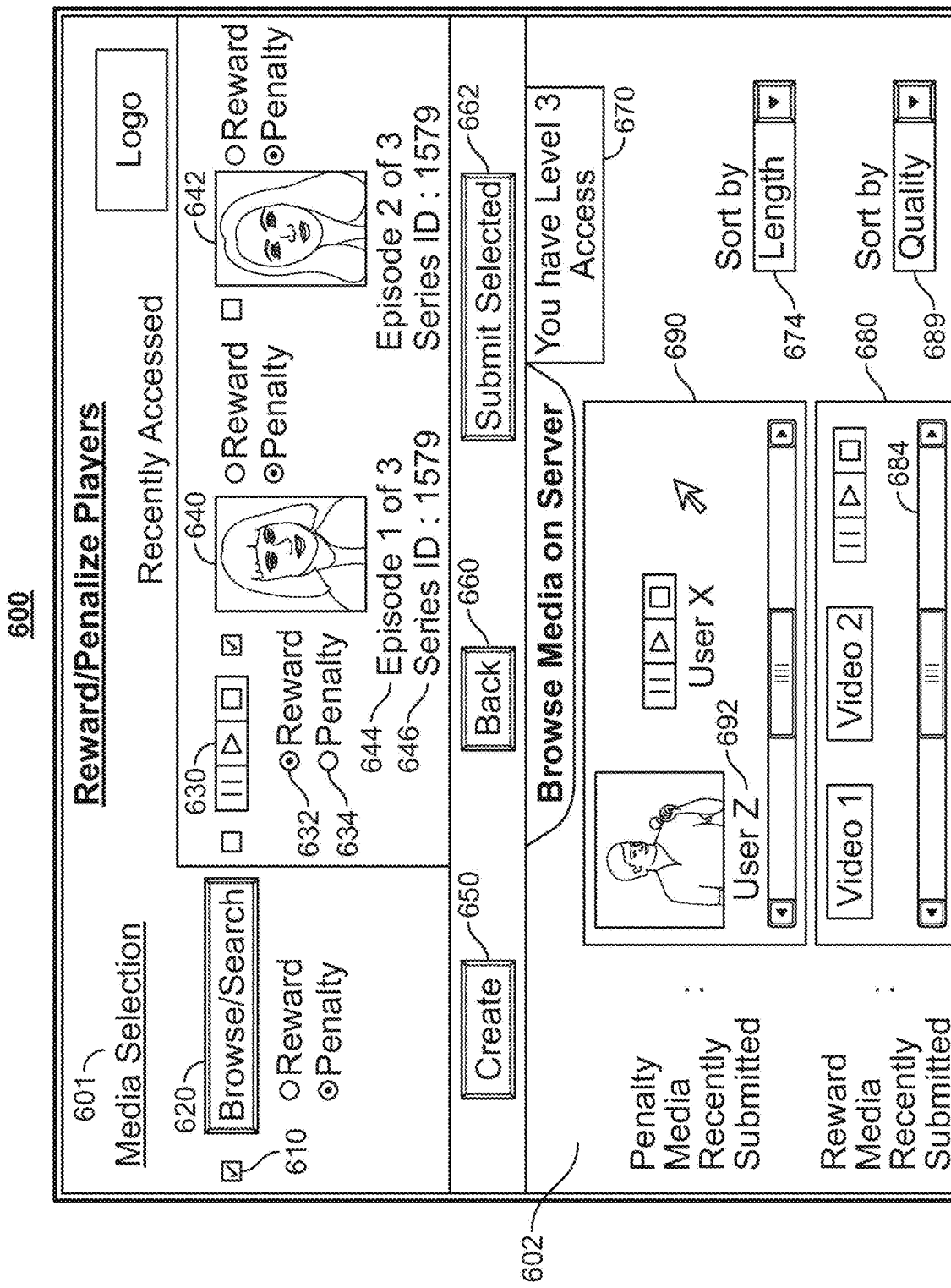

FIG. 6 is illustrative interactive video gaming environment display in accordance with an embodiment of the invention. FIG. 6 includes reward/penalize players screen 600 which the user may use to create and transmit to video asset server 114 reward and penalty media assets. Reward/penalize players screen 600 may include a media asset selection region 601 and a media asset browsing region 602. Although each of the regions is shown in a single display 600, these regions may be broken up into one or more separate displays to accommodate different-sized screens on different devices.

Media asset selection region 601 may allow the user to generate a new reward or penalty media asset for the interactive video game. For example, in the idol game, the user may generate (or create) a media asset segment (video, graphic, image, or audio segment) of the user commenting on a performance of a player in an action (e.g., singing, acting, speaking, or carrying out any form of behavior). The media asset segment may be of any unlimited length and size but, in some implementations, may be limited by the interactive video gaming environment to a predetermined length or size (e.g., less than 5 minutes long or less than 5 megabytes). In some implementations, the length or size of the media asset segment may be limited based on the type of media used to create the segment (e.g., less than 5 minutes for a video segment and less than 10 minutes for an audio segment).

For example, processing circuitry 206 may receive a user selection of create option 650. In response to receiving the user selection, processing circuitry 206 may navigate the user to a display that allows the user to create media asset segment. In particular, processing circuitry 206 may present options for the user asking the user what type of media asset segment the user would like to create. For example, processing circuitry 206 may present the user with options to create a video, audio, graphic, or any combination thereof. Based on the user selection of the option, processing circuitry 206 may activate the appropriate or necessary input circuitry (e.g., camera 204, user input interface 210, microphone, etc.). Processing circuitry 206 may request the user to input an indication of whether the created media asset segment is a reward or a penalty media asset. Processing circuitry 206 may record (store) the media asset segment created by the user along with the indication of whether the media asset segment is a reward or penalty media asset upon receipt of a user indication that the creation of the media asset segment is complete.

In some implementations, processing circuitry 206 may store the media asset segment, along with the indication of whether the media asset segment is a reward or a penalty media asset, locally in storage 208 of user equipment device 200. In some implementations, processing circuitry 206 may upload and transmit the created media asset segment, along with the indication of whether the media asset segment is a reward or a penalty media asset, to video asset server 114 for storage remote from user equipment device 200. Video asset server 114 may store an identifier with the received media asset segment that identifies the user or user equipment device 200 associated with the stored media asset segment and information that indicates and categorizes the media asset as a reward or penalty media asset. In some implementations, each user may be allocated a predetermined amount of storage space on video asset server 114 which may be used for storing reward or penalty media assets (e.g., media segments created by the user) and any other information pertaining to the interactive video game.

In some embodiments, processing circuitry 206 may retrieve media assets that the user previously created or stored. In some implementations, each previously created media asset may be listed using an image or unique identifier associated with the previously created media asset. For example, when the previously generated action is a video segment, a random frame of the video segment (or a frame selected by the user) may be shown within media asset selection region 601. In some implementations, the previously generated action may be a graphic or an image, and in these circumstances, a thumbnail of the previously generated graphic or image may be depicted on the display within media asset selection region 601. In some implementations, the previously generated action may be an audio segment, and in these circumstances, audio playback options 630 with a title of the previously generated action may be shown within media asset selection region 601.

In some implementations, the user may create the media asset as a series of media assets. In particular each media asset may be an episode of the series of media assets. In such circumstances, processing circuitry 206 may display the unique identifier 640 of the media asset series (e.g., a frame of video or cover image that is unique to the series) in media asset selection region 601. Processing circuitry 206 may include information with the media asset series that identifies the episode 644 of the media asset series corresponding to the identifier 640 and the series 646 (e.g., a unique number of the series or title of the series). For example, the series may be episodes of the television series "Family Guy". Accordingly, each identifier 640 and 642 may include the cover image of the series "Family Guy." In addition, episode identifier 644 may identify the particular episode of the series that corresponds to the media asset identifier 640. When a media asset series is presented to a player as a media asset reward or penalty, the series information (e.g., episode number and series title or number) may be provided to the player.

In some embodiments, the user may select, click on, or highlight an area corresponding to where a listing of the media asset is displayed in region 601. In response to receiving the user input (selecting, clicking on, or highlighting), processing circuitry 206 may play back the media asset where the corresponding listing of the action is shown. For example, when the user selects, clicks on, or highlights audio options 630 that corresponds to an audio media asset, processing circuitry 206 may begin playback from the start or other position of the audio segment.

The listings of media assets displayed in media asset selection 601 may correspond to any locally or remotely stored media asset created by the user. In some implementations, processing circuitry 206 may receive a selection of a browse/search stored option 620. Browse/search stored option 620 may be selected by the user when the user does not see a listing for a media asset which was previously created by the user. For example, the user may have created the media asset on a different user equipment device 200 on another occasion which may not have been synchronized with the information about the previously generated media assets stored on user equipment device 200 currently being used by the user. For example, the user may be accessing the interactive video game using a portable device and the listings of the media assets may be those that are known to the portable device. The user may have generated a media asset using a television equipment device which may not have been transferred into storage of the portable device. Accordingly, in response to receiving the user selection of browse/search stored option 620, processing circuitry 206 may display a menu through which the user may locate media assets stored in other devices or locations (e.g., the television equipment device or a portable storage device such as a USB key). Processing circuitry 206 may add a listing for the media asset retrieved from the browsed location (e.g., the portable storage device) for the user to select for inclusion in the game.

In some implementations, browse/search stored option 620 may be selected to retrieve a previously stored player action. For example, the user may have previously participated as a player in the interactive video game and submitted one or more actions for ranking in game mode. The user may select any of those one or more previously submitted actions for transmission to video asset server 114 as a reward or penalty media asset in a similar manner as discussed above and below for other reward or penalty media assets. For example, the player may view a media asset received as a reward or penalty for a submitted action in screen 500. The player may be provided with an options region 540 (FIG. 5) allowing the player to submit the action that resulted in the reward or penalty media asset as a reward or penalty media asset.

In some implementations, processing circuitry 206 may determine whether the media asset being viewed in region 520 corresponds to a reward or a penalty media asset. Based on the determination, processing circuitry 206 may customize options region 540. For example, processing circuitry 206 may determine that media asset 522 corresponds to a reward media asset. In response to the determination, processing circuitry 206 may ask the player whether the player would like to submit the action that resulted in the reward media asset as a reward media asset. Processing circuitry 206 may receive a user selection of yes option 542 and, in response, may transmit, as a reward media asset, the action that resulted in the reward media asset 522 to video asset server 114. In particular, processing circuitry 206 may submit the action to video asset server 114 with an indication that the media asset is categorized as a reward media asset. Alternatively, processing circuitry 206 may receive a user selection of submit as penalty media asset option 544 and, in response, may transmit, as a penalty media asset, the action that resulted in the reward media asset 522 to video asset server 114. In particular, processing circuitry 206 may submit the action to video asset server 114 with an indication that the media asset is categorized as a penalty media asset.

Media asset selection region 601 may include a reward option 632 and penalty option 634 next to or associated with each displayed media asset listing. Processing circuitry 206 may receive input from the user specifying whether a media asset corresponding to a displayed media asset listing should be categorized as a reward or penalty using each corresponding reward option 632 and penalty option 634 of the listing. Media assets corresponding to the listings which are specified by the user to be reward media assets using, for example, reward option 632, are stored as reward media assets. When the media assets are submitted to video asset server 114, video asset server 114 categorizes those media assets, having reward option 632 selected, as reward media assets. Media assets corresponding to the listings which are specified by the user to be penalty media assets using, for example, penalty option 634, are stored as penalty media assets. When the media assets are submitted to video asset server 114, video asset server 114 categorizes those media assets, having penalty option 634 selected, as penalty media assets. In some implementations, the media assets may be categorized and stored as both penalty and reward media assets and accordingly both options 632 and 634 may be selected for such media assets.

Media asset selection region 601 may include a selection element 610 (e.g., a checkbox) next to or associated with each displayed media asset listing. Processing circuitry 206 may receive input from the user selecting one or more media assets using each corresponding selection element 610. The media assets corresponding to the listings which are selected by the user using, for example, selection element 610 may be submitted to video asset server 114 and provided to a player of the interactive video gaming environment as a reward or penalty media asset. In particular, processing circuitry 206 may receive a user selection of submit selected option 662 and in response submit the selected media assets to video asset server 114. Processing circuitry 206 may include with the submission to video asset server 114 an indication of whether the media assets are reward or penalty media assets based on whether option 632 or 634 is selected.

In some embodiments, an editor, host, system administrator or curator (e.g., a human managing operations of the video game) may access or log into video asset server 114 to monitor some or all of the media assets submitted to video asset server 114. In some implementations, some or all of the media assets submitted to video asset server 114 may not be provided to players as reward or penalty media assets until the editor, host, system administrator or curator approves the submitted media asset. In particular, the editor, host, system administrator or curator may view media assets pending approval to determine whether the content is too explicit or exceeds a rating that players are willing to tolerate or that is associated with the video game. When the editor, host, system administrator or curator determines the media asset exceeds a rating or is too explicit, the editor, host, system administrator or curator may reject or not approve the submitted media asset and inform the user who submitted the rejected media asset. In some implementations, users may be blocked from submitting media assets if they submit more than a predetermined number of media assets that get rejected, for example because of being too explicit. In some implementations, the editor, host, system administrator or curator may monitor the submitted media assets to determine whether they are appropriately categorized as being a reward or penalty. The editor, host, system administrator or curator may re-categorize the media assets from reward to penalty or from penalty to reward based on the content of the media asset or some other factor deemed appropriate by the editor, host, system administrator or curator. Video asset server 114 may associate the stored media asset as being a reward media asset when the editor, host, system administrator or curator changes the user assigned category from a penalty media asset to a reward media asset. Alternatively, video asset server 114 may associate the stored media asset as being a penalty media asset when the editor, host, system administrator or curator changes the user assigned category from a reward media asset to a penalty media asset. In some embodiments, users may be penalized (e.g., by having their level in the game play reduced) for submitting media assets that are not correctly categorized as reward or penalty media assets, as determined by the editor, host, system administrator or curator or other players or users.

In some embodiments, video asset server 114 may determine whether the user is authorized to submit the reward or penalty media asset to the interactive video game before storing the reward or penalty media asset on video asset server 114 for provision to a player as a reward or penalty. In some implementations, video asset server 114 may determine that the user is authorized based on a level of the user within the interactive video game. For example, a user that is in a higher level of the interactive video game may be authorized to submit a greater number of media assets as rewards or penalties in a given period than a lower level of the same game.

In some implementations, player action server may determine that the user is authorized based on a predetermined number of player actions the user has previously ranked. For example, a user that has ranked a predetermined number of player actions may be authorized to submit a predefined number of reward or penalty media assets. There may be a one-to-one correspondence between the number of player actions ranked and the number of media assets the user may submit. Alternatively, the user may be required to rank 10 player actions before being authorized to submit a single reward or penalty media asset.

In some embodiments, when the user is not authorized (e.g., because the maximum number of media assets that the player can submit has been reached), the user may be presented with a set of options to become authorized. A buy more option and a rank others option may be presented to the unauthorized user. The buy more option and rank others options may operate in a similar manner as buy more option 460 and rank others option 462 (FIG. 4). In particular, processing circuitry 206 may receive a user selection of the buy more option and in response may allow the user to purchase the authorization to submit a given number of media assets as rewards or penalties. For example, the user may pay service provider 102 ten dollars for the authorization to submit 20 reward or penalty media assets. Processing circuitry 206 may receive a player selection of the rank others option and in response may navigate the user to a screen (e.g., a screen that includes rank others region 510 (FIG. 5)) where the user ranks player actions to receive authorization to submit a given number of reward or penalty media assets.

In some embodiments, a user may browse reward and penalty media assets stored on video asset server 114. In particular, without submitting an action or otherwise participating in the interactive video game, the user may navigate to media asset browsing region 602 to search and browse reward and penalty media assets submitted by users and/or players. Media asset browsing region 602 may display separately media asset listings for media assets categorized as rewards and media assets categorized as penalties. For example, a reward media asset listing 692 may be displayed on a top portion with an indication that media asset listing 692 is categorized as a reward. Similarly, a penalty media asset listing 680 may be displayed on a bottom portion with an indication that media asset listing 680 is categorized as a penalty. Each displayed media asset listing may include an identifier (e.g., titles of the respective media assets, an image associated with the media asset or any other unique identifier associated with the media asset that identifies the media asset to the player). In some implementations, the displayed identifier may be a picture or image of (or associated with) the user or player that created or submitted the reward or penalty media asset.

In some implementations, reward and penalty media assets may be mixed together and displayed as one region in region 602. In such circumstances, processing circuitry 206 may display one or more options 674 and 689 to sort, organize and/or categorize the displayed media assets. For example, processing circuitry 206 may display an option (not shown) for the user to instruct processing circuitry 206 to only display reward media assets or only display penalty media assets in region 602. Processing circuitry 206 may display option 689 for the user to instruct processing circuitry 206 to only display reward and/or penalty media assets that include content of a certain type (e.g., drama, action, comedy, etc.) and/or that are of a certain media type (e.g., video media assets, audio media assets, graphics, website, etc.) and/or that are of a certain quality (e.g., above a certain image resolution or created by a particular source (e.g., a celebrity or user)). Processing circuitry 206 may display option 674 for the user to instruct processing circuitry 206 to only display reward and/or penalty media assets that are of a certain length.

Processing circuitry 206 may receive a user selection of any one of the displayed media assets 692 and 680 and may retrieve the corresponding reward or penalty media asset from video asset server 114. Processing circuitry 206 may play back and display the retrieved media asset in region 602. Alternatively, processing circuitry 206 may play back and display the retrieved media asset in a separate navigation screen. In some implementations, processing circuitry 206 may navigate the user to screen 500 and play back and display the retrieved reward or penalty media asset in region 520 (FIG. 5).

In some embodiments, processing circuitry 206 may organize the penalty and/or reward media assets in region 602 based on any suitable criteria. For example, processing circuitry 206 may sort the displayed media assets in an order based on creation date, access date, popularity, size, quality, popularity among users of the interactive video game, an alphabetical order of titles, or any other suitable criteria. For example, processing circuitry 206 may display the listings of the previously stored reward or penalty media assets in sequence from lowest quality to highest quality reward or penalty media asset, or the other way around.

In some embodiments, video asset server 114 may restrict the type of reward or penalty media assets that the user can browse in region 602 based on the level within the interactive video game that the user is in. In particular, video asset server 114 may determine whether the user is authorized to browse reward or penalty media assets (that have not been earned or received as part of game play of the user) of the interactive video game before allowing the user to access media asset listings in region 602. In some implementations, video asset server 114 may determine that the user is authorized based on a level of the user within the interactive video game. Video asset server 114 may display a prompt 670 indicating the level of authorization the user has in region 602. For example, a user that is in a higher level (e.g., has a higher level of authorization) of the interactive video game may be authorized to view a certain type (e.g., high quality or low quality) or certain quantity of reward or penalty media assets than a lower level of the same game. Video asset server 114 may determine the authorization level of the user in any manner previously described above (e.g., in connection with submission of an action for ranking or submission of a media asset as a reward or penalty).

In some implementations, video asset server 114 may allow a user to browse all reward and penalty media assets stored in video asset server 114 using region 602 but may limit access to those media assets based on the level of authorization of the user. For example, region 602 may display media asset listings for all stored media assets on video asset server 114. However, upon receiving a user selection of one of the media assets for access, viewing or playback, video asset server 114 may determine whether the user has the appropriate level of authorization to access, view or play back the corresponding media asset. Each media asset stored on video asset server 114 may be associated with a particular level of authorization. Video asset server 114 may determine the level of authorization of the user requesting access to the media asset and compare that authorization level with the authorization level associated with the requested media asset. When the authorization level of the user meets or exceeds the authorization level associated with the requested media asset, video asset server 114 may transmit or make available the requested reward or penalty media asset to the user for access, viewing or playback. As discussed above, each media asset may be associated with copyright restrictions and accordingly, processing circuitry 206 may only allow the user to view the media asset that is requested without being able to store, share or transmit the requested media asset with any other equipment or user.

In some embodiments, the action submitted by the player may be based on exercise performed by the player. For example, the player may be using exercise equipment and processing circuitry 206 and may determine how poor or well the player is exercising. Processing circuitry 206 may apply the determination of how poor or well the player is exercising as the action. Processing circuitry 206 may display media assets to the player while the player uses the exercise equipment based on how poor or well the player is exercising. In particular, processing circuitry 206 may monitor how long and in what intensity the player is exercising. Processing circuitry 206 may select media assets for display or provision to the player based on the length of time and intensity of the exercise.

Figure 7:
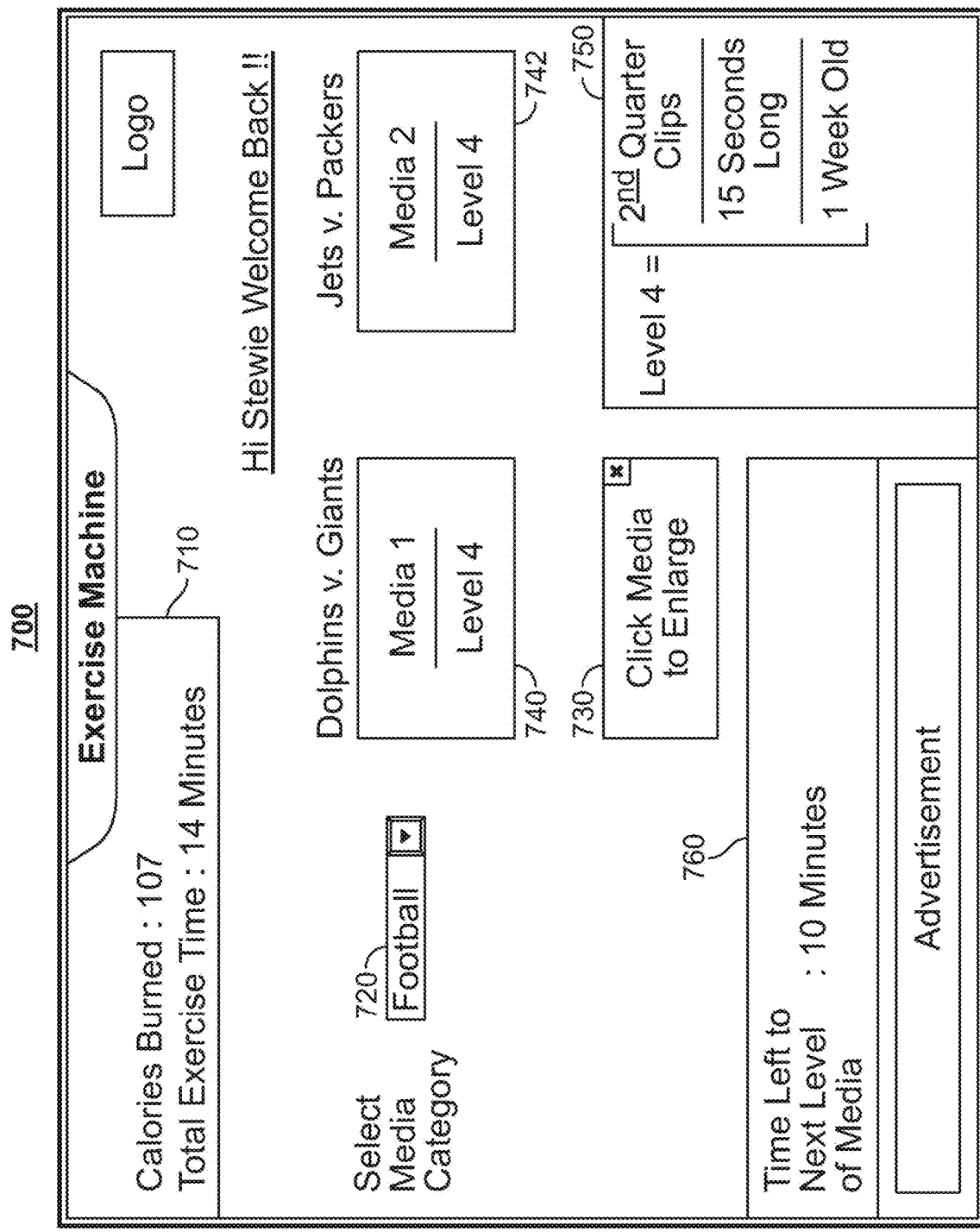
FIG. 7 is illustrative exercise equipment running an interactive video gaming environment in accordance with an embodiment of the present invention.

FIG. 7 is illustrative exercise equipment running an interactive video gaming environment in accordance with an embodiment of the present invention. FIG. 7 includes an exercise display screen 700 of the interactive video gaming environment which provides the exercise application. In some implementations, the exercise application may be a software application installed on a portable device (e.g., an iPhone or iPad) that the player holds or wears while exercising. In such circumstances, the portable device may include electronic hardware or equipment attached to, coupled to, or worn by the player to monitor status of the exercise (e.g., heartbeat, distance run, or any other suitable biological characteristic or characteristic associated with the exercise). In some implementations, the exercise application may be a local software application installed on a dedicated exercise machine (e.g., a treadmill, bicycle or elliptical machine). The dedicated machine may be equipped to monitor status of exercise done by the player as well as any biological information (e.g., heartbeat). Display screen 700 may be the home screen of the interactive video gaming environment that is presented to the player upon starting up the exercise application.

Display screen 700 may include an exercise status region 710. Exercise status region 710 may include information about the current exercise being done by the player. For example, exercise status region 710 may include an elapsed time the player has been exercising and/or a total amount of calories burned. Exercise status region 710 may include any other information pertinent to the particular sport or exercise (e.g., total distance run, heart rate, etc.). Exercise status region 710 may display any information monitored by processing circuitry 206 using one or more biological devices attached to, worn by, or coupled to the player.

In some embodiments, the player may select a type of media that the player desires to access while exercising. For example, processing circuitry 206 may receive a player selection of media category option 720. Processing circuitry 206 may, in response to receiving the player selection, display a menu with categories of media assets for the player to choose. For example, the categories may include sports, comedy, action, drama, sitcoms, etc. The player may select any number of categories. In particular, by selecting multiple categories, the player may be presented with a wider range of media asset types. Each category displayed within the menu may include one or more subcategories for the player to select to further refine the media asset selection. For example, when the player selects sports category, one or more types of sports may be presented as options for the player to select (e.g., football, soccer, basketball).

As the player is exercising, processing circuitry 206 may present one or more media assets corresponding to a selected category. The media assets may be presented one at a time or in a mosaic manner where multiple media assets are displayed simultaneously. For example, when football category is selected, processing circuitry 206 may display a first media asset 740 corresponding to a first game and a second media asset 742 corresponding to a second game. Each media asset 740 and 742 may include a live video feed from the respective game. In some implementations, each media asset may include clips or segments of highlights of the respective game.

In some embodiments, the media assets selected for presentation to the player while the player is exercising may be selected based on various criteria. For example, the criteria may include one or more categories selected by the player, a level within the interactive video game the player is currently in, length of time the player is using the exercise equipment, upgrade package or package type purchased by the player, any combination thereof, or any other suitable criteria. Each media asset presented in display 700 may include an indication of the level within the interactive video game associated with the media asset.

In some embodiments, when the player starts accessing the exercise application, processing circuitry 206 may retrieve an exercise profile associated with the player. The exercise profile may store various information about the player. For example, the exercise profile may store information (statistics) about prior exercise performed by the player, previously selected media asset categories, a level within the interactive video game the player is in, and goals the player would like to achieve. Processing circuitry 206 may customize the media assets presented to the player during the current exercise session based on the retrieved exercise profile. In some implementations, the exercise profile may be stored on a remote server and retrieved from the remote server when the player logs into the exercise application.

In some embodiments, processing circuitry 206 may retrieve the media assets presented to the player from video asset server 114. Processing circuitry 206 may transmit to video asset server 114 information identifying the current player (or user) of the exercise application and the exercise profile associated with the player. Video asset server 114 may select one or more media assets stored on video asset server 114 for presentation to the player. For example, video asset server 114 may select the one or more media assets having a particular measure of quality based on the level in which the player is within the interactive video game. In particular, video asset server 114 may select higher quality media assets when the player is in higher levels and lower quality media assets when the player is in lower levels. The media assets presented to the player may be selected (by processing circuitry 206 or video asset server 114) based on an authorization level of the player which may be determined in a similar manner as discussed above.

In some implementations, before transmitting the selected media assets to the player for presentation during the exercise, video asset server 114 may provide the selected media assets to media processing server 118. Media processing server 118 may modify or process the selected media assets in a similar manner as previously discussed (e.g., associate one or more advertisements with the selected media assets or otherwise process the media assets). The media assets processed by media processing server 118 may then be transmitted to the player during the exercise or use of the exercise application.

In some embodiments, the player may advance to higher levels as the player improves exercising. Processing circuitry 206 may determine whether the player is improving exercising based on how close the player is in reaching the exercise goals set by the player in the exercise profile. In some implementations, processing circuitry 206 may determine the player is improving by monitoring a length of time the player is exercising in a given session of the exercise application.

In some implementations, processing circuitry 206 may display information prompt 750 that describes the media assets that correspond to a particular level within the interactive video game. For example, when the player is within level 4 of the interactive video game, the media assets that may be presented to the player may include clips or segments of second quarters of football games, which are 15 seconds long, and are 1 week old. Media assets that correspond to higher levels (e.g., level 5) may include clips or segments of third quarters of football games, which are 30 seconds long, and are 3 days old. The player may interact with prompt 750 to view a description of media assets that correspond to higher and/or lower levels within the interactive video game. Allowing the player to view descriptions of higher level media assets may incentivize the player to improve their performance in the exercise application to be authorized to access and be presented with media assets corresponding to the higher level.

In some embodiments, processing circuitry 206 may provide a prompt 760 that indicates to the player the amount of time or measure of exercise the player has to achieve to reach the next level of the interactive video game. For example, processing circuitry 206 may monitor one or more exercise attributes of the player (e.g., a length of time the player is using the exercise application, a heart rate, a distance the player has run, etc.). Processing circuitry 206 may compare the monitored one or more attributes (e.g., the length of time) to one or more predetermined thresholds corresponding to the attributes. In some implementations, the attributes that are monitored and the predetermined threshold may be selected based on the exercise profile associated with the player. The predetermined threshold may be a time period, a target heart rate, an exercise intensity level, or any combination thereof or any other criteria or attribute by which exercise goals are measured.

In some implementations, processing circuitry 206 may subtract the elapsed time the player has used the exercise application from the predetermined threshold to compute the time remaining until the player reaches the next level in the exercise application. Processing circuitry 206 may present media assets corresponding to a current level until the player reaches the next level in the interactive video game. Once the player reaches the next level, processing circuitry 206 may adjust the predetermined threshold up (e.g., increase the amount of exercise time required) and present media asset corresponding to the next level the player has achieved. Processing circuitry 206 may continuously and iteratively increase the level within the interactive video game the player is in each time the player reaches the next predetermined threshold.

An option prompt 730 may be presented for the player to instruct processing circuitry 206 to select one of the displayed media assets for presentation in a full screen format or in a larger view or portion of the display screen than other media assets. For example, the player may select media asset 740 and, as a result, processing circuitry 206 may display the corresponding media asset in full screen format. Alternatively, processing circuitry 206 may display the selected media asset on a larger portion of the display screen than the non-selected media asset 742. In some implementations, processing circuitry 206 may present the selected media asset in a full screen format and the one or more non-selected media assets in a picture-in-picture format within the full screen display of the selected media asset.

In some embodiments, after the player completes the current session of exercise, the exercise profile associated with the player may be updated and stored (locally or remotely). Advertisements presented to the player during the exercise session may be selected and displayed in any manner discussed above. In particular, when advertisements are associated with a media asset presented to the player during the exercise session, the advertisements may be displayed in a region of the display separate from the media assets, as overlays on top of the selected media assets, before the media assets are presented or after the media assets are presented.

In some embodiments, the interactive video gaming environment may be a three-dimensional (3D) interactive video gaming environment. For example, the interactive video gaming environment may be a stereoscopic interactive video gaming environment. Stereoscopic interactive video gaming environment may require the user to wear a stereoscopic optical device (e.g., 3D glasses) to view reward or penalty media assets in 3D. Any portion of the interactive video gaming environment discussed above may be viewed or accessed in 3D. For example, player actions may be created, accessed or generated in 3D using 3D-enabled camera equipment on user equipment device 200 and/or a 3D-enabled display. Reward or penalty media assets may be created, accessed and/or generated in 3D using 3D-enabled camera equipment on user equipment device 200 and/or a 3D enabled display. Any one of the navigation screens discussed above may be accessed and/or generated in 3D using user equipment device 200 and/or a 3D-enabled display. Although the discussion above and below is provided in the context of a stereoscopic environment requiring 3D optical devices, these teachings are equally applicable to environment and systems that generate 3D environments without requiring 3D optical devices (e.g., without requiring 3D glasses to be worn).

Figure 8:
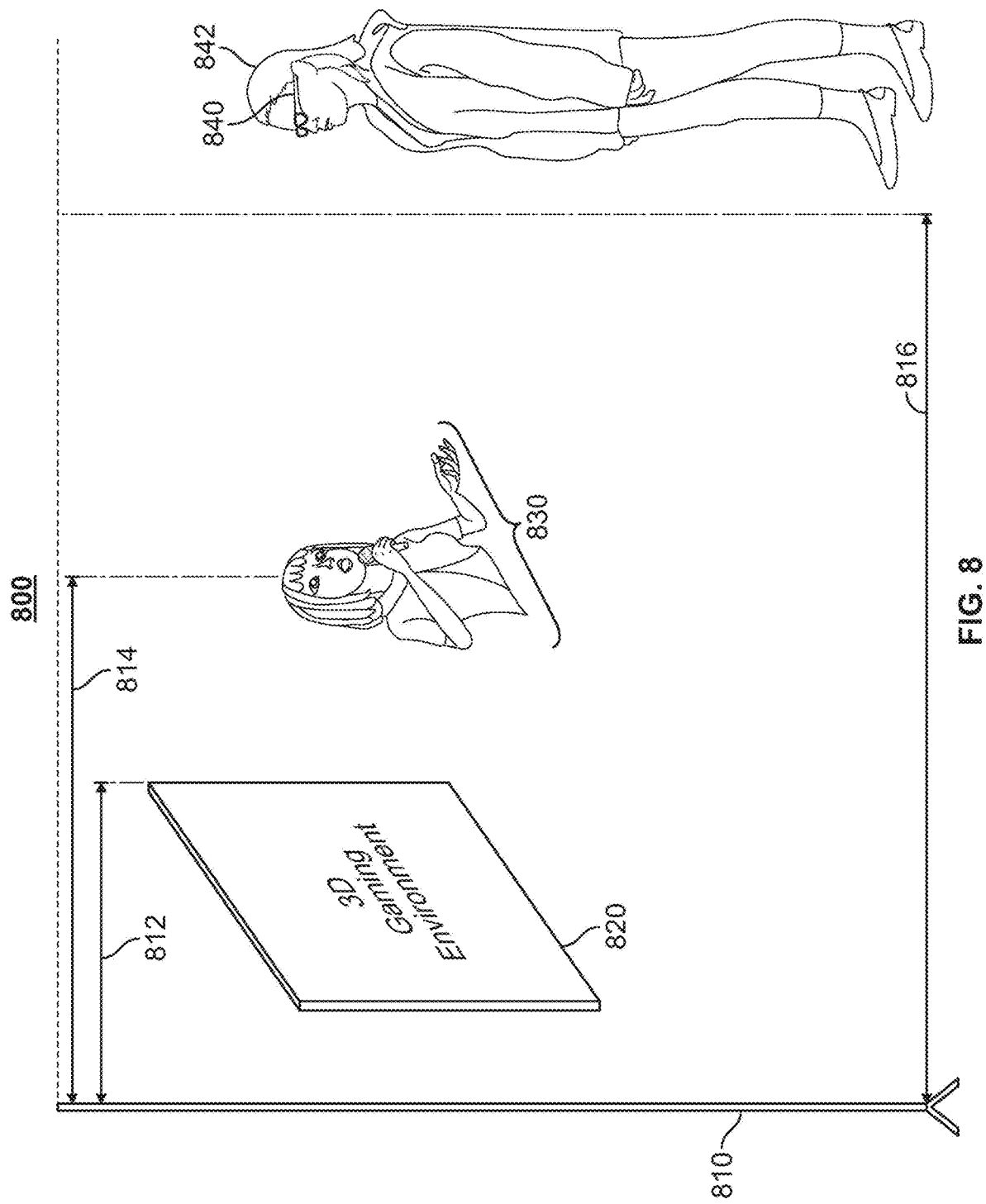
FIG. 8 is an illustrative 3D interactive video gaming environment in accordance with an embodiment of the present invention.

FIG. 8 is an illustrative 3D interactive video gaming environment 800 in accordance with an embodiment of the present invention. 3D interactive video gaming environment 800 may include 3D display device 810. A user or player 842 may be wearing or equipped with a 3D optical device 840. User or player 842 may be positioned at a distance 816 away from display device 810. When accessing a 3D portion of the interactive video game, a 3D navigation screen 820 of the interactive video game may be perceived by user 842 to appear at a distance 812 from display device 810 when seen through optical device 840. An action or media asset 830 may be perceived to appear by user 842 at a distance 814 from display device 810 when seen through optical device 840. More specifically, action or media asset 830 may appear to user 842 as being closer to user 842 than 3D navigation screen 820 and accordingly may appear more prominently to user 842. In particular, distance 816 may be further away from display device 810 than distance 830 is from display device 810.

In some implementations, the determination of whether to position a media asset or action closer to user 842 in 3D space than navigation screen 820 may be performed based on the context of the interactive video game. For example, when the user is playing back a media asset, the media asset may be positioned closer to the user in 3D space than the background of the interactive video game screen. Alternatively, when the user is accessing features of the interactive video game screen (e.g., browsing for player actions to submit or browsing for reward or penalty media assets previously submitted), the interactive video game screen portion that the user is using may be positioned closer to the user in 3D space than other portions of the interactive video game screen that are not being used.

Figure 9:
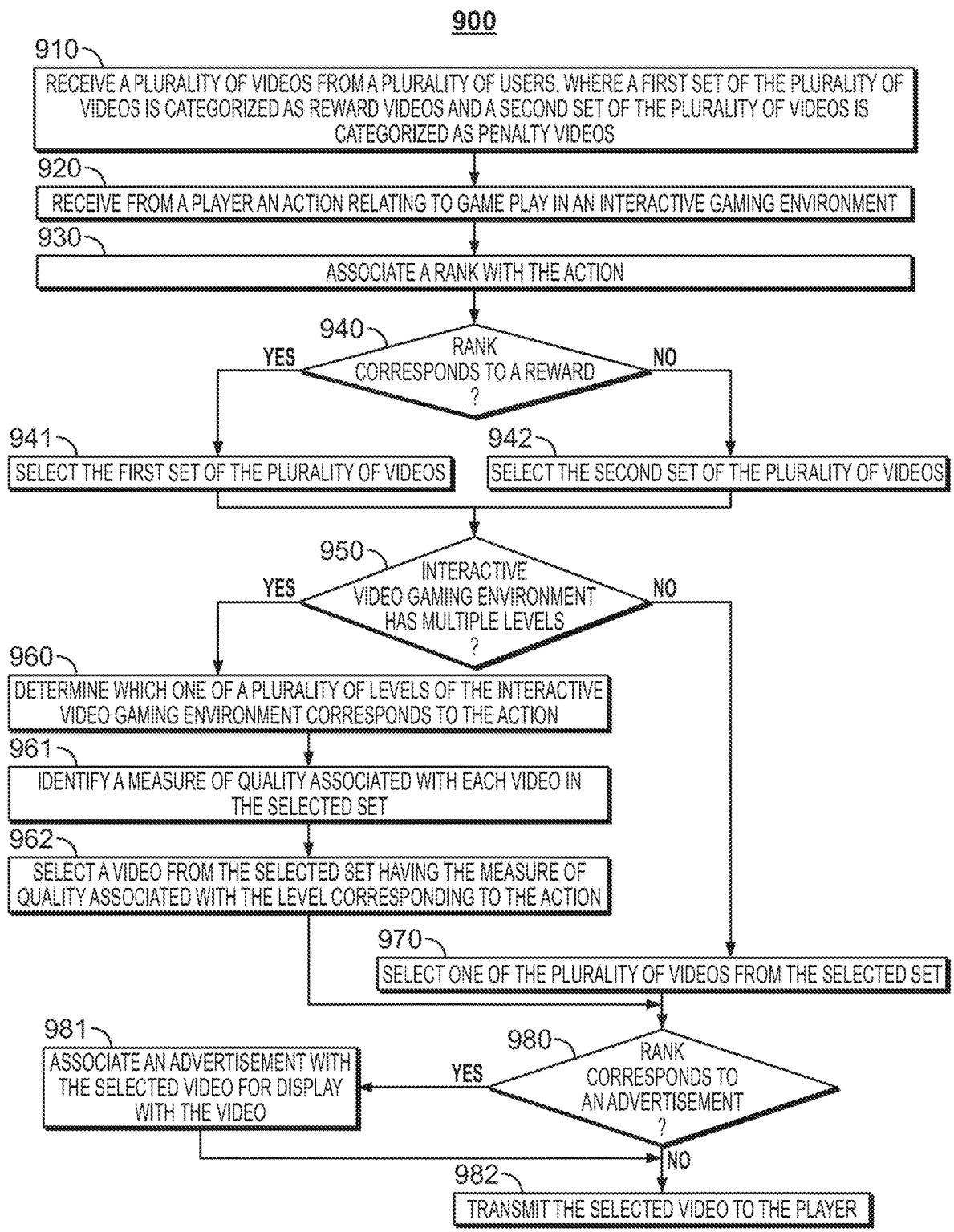
FIGS. 9-12 are illustrative flow diagrams of the interactive video gaming environment in accordance with embodiments of the present invention.

FIG. 9 is an illustrative flow diagram 900 of an interactive video gaming environment in accordance with an embodiment of the present invention. At step 910, a plurality of videos is received from a plurality of users. A first set of the plurality of videos is categorized as reward videos and a second set of the plurality of videos is categorized as penalty videos. For example, video asset server 114 may receive and store from a plurality of users reward or penalty media assets that the users create (FIG. 1). The users may generate the reward or penalty media assets using media asset selection region 601 (FIG. 6).

At step 920, an action is received from a player relating to game play in the interactive video gaming environment. For example, player action server 116 may receive and store from a player an action (e.g., a video) that the player creates (FIG. 1). The player may generate the action using action selection region 410 (FIG. 4).

At step 930, a rank is associated with the action. For example, player action server 116 may make the received action available to a plurality of users of the interactive video gaming environment and receive a rank for the action from each of the users. Users may rank the action using rank others region 510 (FIG. 5). Player action server 116 may compute an overall rank for the action based on the received ranks (e.g., by computing an average of the ranks assigned by the users) and may associate the rank with the action stored in player action server 116.

At step 940, a determination is made as to whether the rank corresponds to a reward. When the rank is determined to correspond to a reward, the process proceeds to step 941, otherwise the process proceeds to step 942. For example, player action server 116 may provide the rank to video asset server 114 which may determine by the value of the rank whether the rank corresponds to a reward or a penalty (e.g., a rank valued greater than 6 may be determined to correspond to a reward).

At step 941, the first set of the plurality of videos is selected. For example, video asset server 114 may select the set of media assets categorized as reward media assets for provision to the player by looking up in a database the media assets that are categorized as reward media assets.

At step 942, the second set of the plurality of videos is selected. For example, video asset server 114 may select the set of media assets categorized as penalty media assets for provision to the player by looking up in a database the media assets that are categorized as penalty media assets.

At step 950, a determination is made as to whether the interactive video gaming environment has multiple levels. When the interactive video gaming environment is determined to have multiple levels, the process proceeds to step 960, otherwise the process proceeds to step 970. For example, video asset server 114 or player action server 116 may determine the type of interactive video gaming environment being played and whether there are multiple levels associated with the interactive video gaming environment.

At step 960, a determination of which one of the plurality of levels of the interactive video gaming environment corresponds to the action (or the player). For example, video asset server 114 or player action server 116 may keep a user or player profile for the user or player and determine based on the profile what level the given user or player is in within the gaming environment. Information identifying the level may be provided in the action received by player action server 116.

At step 961, a measure of quality associated with each video in the selected set is identified. For example, video asset server 114 may identify whether each media asset in the selected set corresponds to a high quality media asset or a low quality media asset (e.g., whether the media assets have high or low image resolution). Although the above and below discussion pertains to a media assets being of high or low quality, the media assets in video asset server 114 may be any range of qualities (e.g., very low quality, low quality, average quality, medium quality, medium-high quality, high quality, very high quality, etc.).

At step 962, a video is selected from the selected set having the measure of quality associated with the level corresponding to the action. For example, video asset server 114 may select a high quality reward or penalty media asset when the level the player is in corresponds to a high level (e.g., level 6 out of 10 or higher) and may select a low quality reward or penalty media asset when the level the player is in corresponds to a low level (e.g., level 5 out of 10 or lower).

At step 970, one of the plurality of videos is selected from the selected set. For example, video asset server 114 may retrieve the media asset from the selected set in any random or pseudorandom manner or based on any other factor discussed above.

At step 980, a determination is made as to whether the rank (or level corresponding to the action) corresponds to an advertisement. When the rank (or level corresponding to the action) is determined to correspond to an advertisement, the process proceeds to step 981, otherwise the process proceeds to step 982. For example, player action server 116 may determine whether the rank associated with the action is lower than a threshold in which case the rank may be determined to correspond to an advertisement. Alternatively, player action server 116 may determine whether the rank associated with the action is higher than a threshold in which case the rank may be determined to not correspond to an advertisement.

At step 981, an advertisement is associated with the selected video for display with the video. For example, media processing server 118 may select an advertisement from advertisement server 122 and associated the selected advertisement with the selected media asset. Media processing server 118 may embed the selected advertisement within the media asset so that the advertisement appears as an overlay or before, after or during presentation of the media asset to the player. Media processing server 118 may alternatively link the advertisement with the media asset such that processing circuitry 206 displays the advertisement separately from the media asset on a display.

At step 982, the selected video is transmitted or made available to the player. For example, the player may navigate to region 520 to play back or access the reward or penalty media asset received from player action server 116 based on the action the player submitted to player action server 116.

Figure 10:
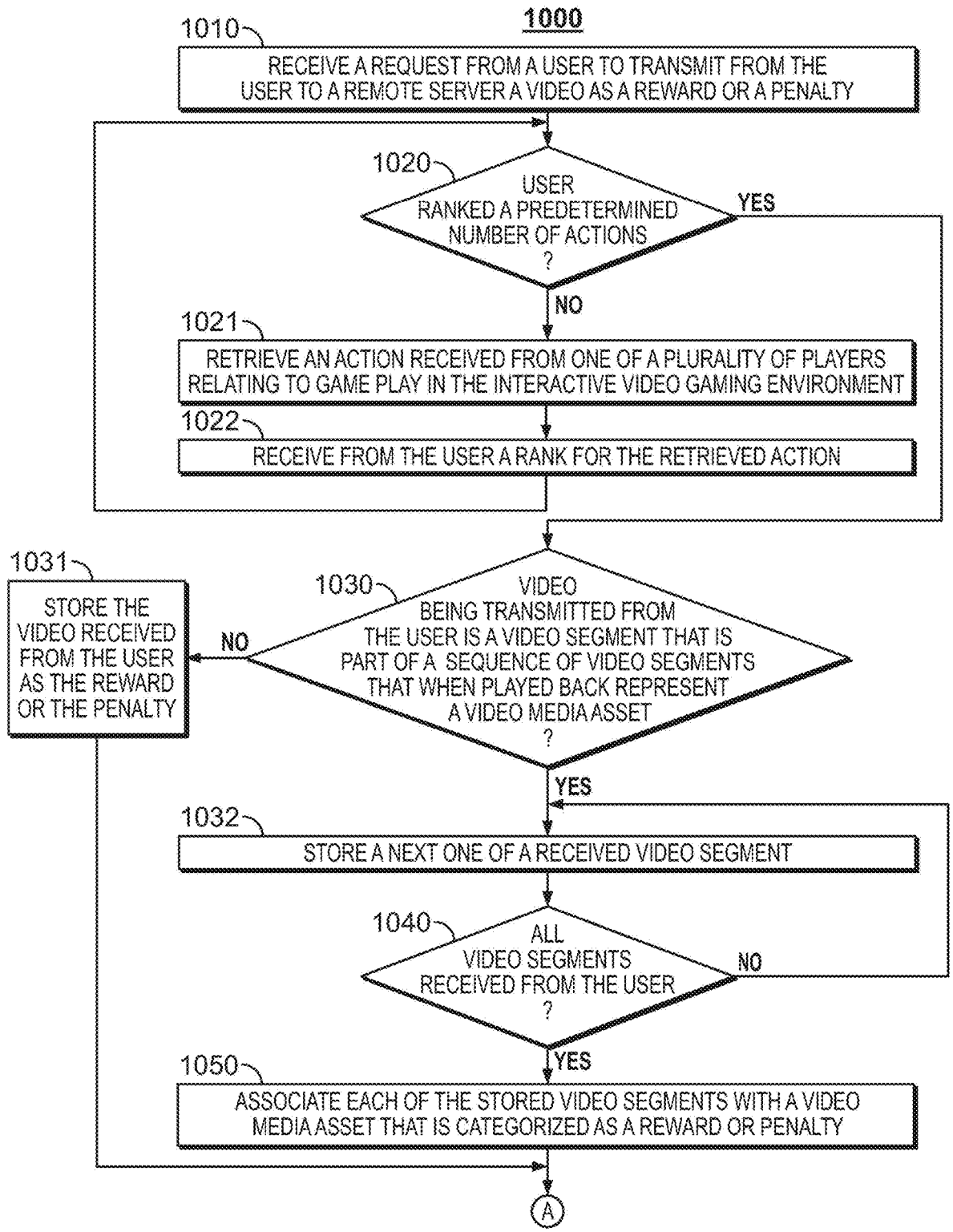

FIG. 10 is an illustrative flow diagram 1000 of an interactive video gaming environment in accordance with an embodiment of the present invention. At step 1010, a request from a user is received to transmit from the user to a remote server a video as a reward or penalty. For example, the user may navigate to media asset selection region 601 to select one or more reward or penalty media assets for transmission to video asset server 114 (FIG. 6).

At step 1020, a determination is made as to whether the user ranked a predetermined number of actions. When the user is determined to have ranked a predetermined number of actions, the process proceeds to step 1030, otherwise the process proceeds to step 1021. For example, video asset server 114 may determine the level of authorization associated with the user. In particular, video asset server 114 may determine whether the user is authorized to transmit or upload a reward or penalty media asset. In some implementations, video asset server 114 may determine the user is authorized based on the number of player actions the user has previously ranked.

At step 1021, an action received from one of a plurality of players relating to game play in the interactive video gaming environment is retrieved. For example, video asset server 114 may retrieve from player action server 116 an action submitted by a player during game play. The action may have been submitted by the player to the player action server 116 using player action selection region 410.

At step 1022, a rank for the retrieved action is received from the user. For example, the action may be presented to the user in region 510. The user may assign a rank to the action presented in region 510 and the assigned rank is received and stored by player action server 116.

At step 1030, a determination as to whether a video being transmitted from the user is a video segment that is part of a sequence of video segments that when played back represent a video media asset. When the video is determined to be part of a sequence, the process proceeds to step 1032, otherwise the process proceeds to step 1031. For example, media assets 640 and 642 may be episodes of a series created by the user (FIG. 6). Each of the episodes may be of equal length and may correspond to a section of the media asset series. Media assets 640 and 642 may be a certain portion (e.g., 3 minutes) of the overall length (e.g., 6 minutes) of a particular media asset.

At step 1031, the video received from the user is stored as the reward or penalty. For example, the user may select option 632 to categorize the media asset selected for submission to video asset server 114 as a reward and/or option 634 to categorize the media asset selected for submission to video asset server 114 as a penalty. Video asset server 114 may store the received media asset as a reward or penalty based on the option selected by the user. Video asset server 114 may categorize the received media asset as a reward or penalty based on the option selected by the user by storing an indicator with the received media asset.

At step 1032, a next one of a received video segment is stored. For example, the user may submit multiple episodes or segments of a media asset either one at a time or all at the same time.

At step 1040, a determination is made as to whether all video segments of the sequence have been received from the user. When all the video segments are determined to have been received, the process proceeds to step 1050, otherwise the process proceeds to step 1032.

At step 1050, each of the stored video segments is associated with a video media asset that is categorized as a reward or penalty. For example, video asset server 114 may determine whether the media segment received from the user is identified as a reward or penalty and, accordingly, store the received segment as a reward or penalty media asset.

Figure 11:
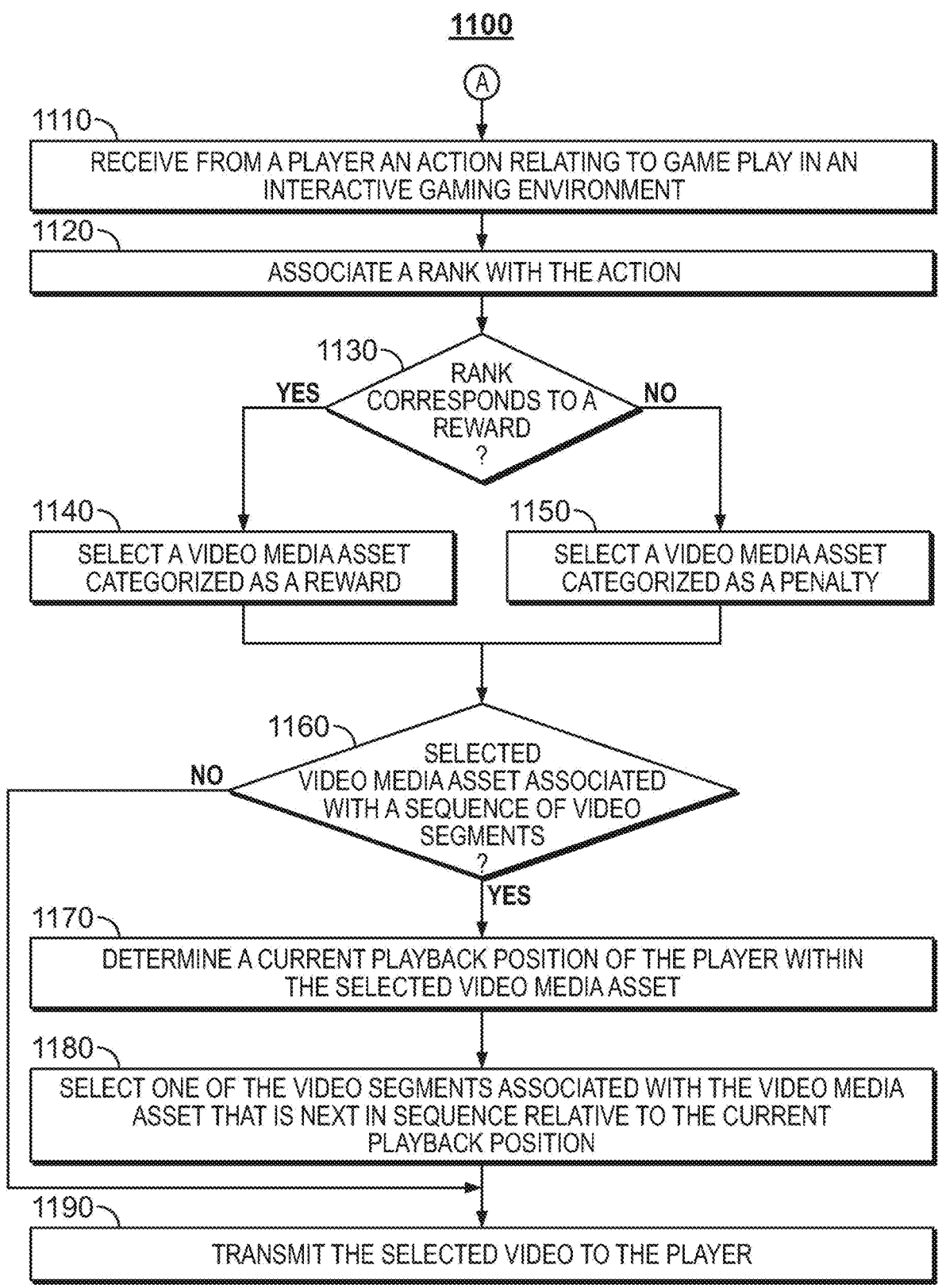

FIG. 11 is an illustrative flow diagram 1100 of an interactive video gaming environment in accordance with an embodiment of the present invention. At step 1110, an action relating to game play is received from a player in an interactive gaming environment. For example, player action server 116 may receive and store from a player an action (e.g., a video) that the player creates (FIG. 1). The player may generate the action using action selection region 410 (FIG. 4).

At step 1120, a rank is associated with the action. For example, player action server 116 may make the received action available to a plurality of users of the interactive video gaming environment and receive a rank for the action from each of the users. Users may rank the action using rank others region 510 (FIG. 5). Player action server 116 may compute an overall rank for the action based on the received ranks (e.g., by computing an average of the ranks assigned by the users) and may associate the rank with the action stored in player action server 116.

At step 1130, a determination is made as to whether the rank corresponds to a reward. When the rank is determined to correspond to a reward, the process proceeds to step 1140, otherwise the process proceeds to step 1150. For example, player action server 116 may provide the rank to video asset server 114 which may determine by the value of the rank whether the rank corresponds to a reward or a penalty (e.g., a rank valued greater than 6 may be determined to correspond to a reward).

At step 1140, a media asset (e.g., a video media asset) that is categorized as a reward is selected.

At step 1150, a media asset (e.g., a video media asset) categorized as a penalty is selected.

At step 1160, a determination is made as to whether the selected media asset is associated with a sequence of video segments. When the selected media asset is determined to be associated with a sequence of video segments, the process proceeds to step 1170, otherwise the process proceeds to step 1190.

At step 1170, a current playback position within the selected media asset is determined. For example, video asset server 114 may determine which media asset segment of a series of a media asset was last provided to the player. In some implementations, video asset server 114 may identify the media asset last provided to the player and determine the time point at which the user ended viewing the media asset as the current playback position. For example, the media asset may be an hour long program and the last segment provided to the user corresponded to the first half of the program. Accordingly, video asset server 114 may determine that the viewing ended at the 30 minute point in the program.

At step 1180, one of the video segments associated with the media asset that is next in sequence relative to the current playback position is selected. For example, video asset server 114 may retrieve the last 30 minute segment of an hour long media asset after determining the player has last been provided with a media asset of the first half of the hour long program.

At step 1190, the selected media asset is transmitted to the player. For example, the player may navigate to region 520 to play back or access the reward or penalty media asset received from player action server 116 based on the action the player submitted to player action server 116.

Figure 12:
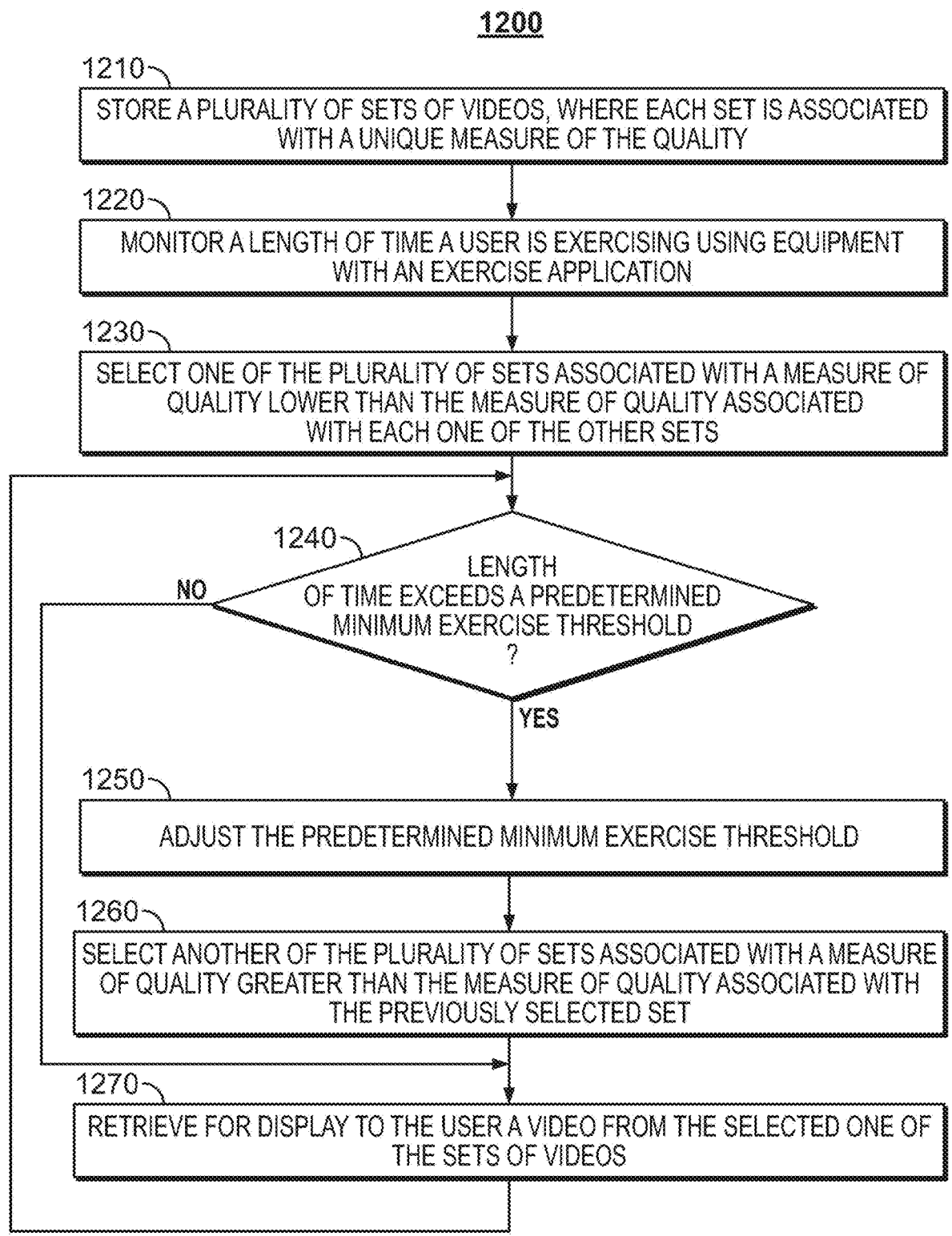

FIG. 12 is an illustrative flow diagram 1200 of an interactive video gaming environment in accordance with an embodiment of the present invention. At step 1210, a plurality of sets of videos is stored, where each set is associated with a unique measure of quality. For example, the measure of quality may be determined based on a level within the interactive video game that the user is in. The videos may be stored and received from video asset server 114 (FIG. 1).

At step 1220, a length of time a user is exercising using equipment with an exercise application is monitored. For example, processing circuitry 206 may monitor how long the user is using the exercise application. In some implementations, processing circuitry 206 may monitor a length or magnitude of some other attribute (e.g., heart rate or distance) instead of time.

At step 1230, one of the plurality of sets of videos associated with a measure of quality lower than the measure of quality associated with each one of the other sets is selected. In some implementations, a set of videos associated with a measure of quality last provided to the user in the previous exercise session may be selected.

At step 1240, a determination is made as to whether a length of time exceeds a predetermined minimum exercise threshold. When the length of time is determined to exceed the minimum exercise threshold, the process proceeds to step 1250, otherwise the process proceeds to step 1270. For example, processing circuitry 206 may determine whether the monitored attribute (e.g., heart rate, time, or distance) exceeds a corresponding minimum predetermined threshold.

At step 1250, the predetermined minimum exercise threshold is adjusted. For example, processing circuitry 206 may increase (or decrease) the minimum exercise threshold based on the type of attribute being monitored.

At step 1260, another of the plurality of sets associated with a measure of quality greater than the measure of quality associated with the previously selected set is selected. For example, processing circuitry 206 or video asset server 114 may select clips or segments that are longer, better quality, newer or correspond to different segments of a game or media asset as a media asset having a greater measure of quality.

At step 1270, a video from the selected one of the sets of videos is retrieved for display to the user. For example, media asset 740 corresponding to a measure of quality associated with level 4 of the interactive video game may be presented to the user (FIG. 7).

It should be understood that the above steps of the flow diagrams of FIGS. 9-12 may be executed or performed in any order or sequence not limited to the order and sequence shown and described in the figure. Also, some of the above steps of the flow diagrams of FIGS. 9-12 may be executed or performed substantially simultaneously where appropriate or in parallel to reduce latency and processing times. Some of the above steps of flow diagrams of FIGS. 9-12 may be skipped.

The above described embodiments of the present disclosure are presented for purposes of illustration and not of limitation, and the present disclosure is limited only by the claims which follow.

What is claimed is:

1. A method comprising:
generating, by processing circuitry, a display of an interactive 3D environment comprising a first feature, a second feature, and a representation of a user in the interactive 3D environment, wherein the feature and the representation of the user have corresponding positions in the interactive 3D environment;
identifying that the first feature is being accessed in the interactive 3D environment by the user; and
in response to identifying that the first feature is being accessed by the user in the interactive 3D environment:
modifying, by the processing circuitry, at least one of the position of the first feature and the position of the second feature, such that the position of the first feature becomes closer to the position of the representation of a user in the interactive 3D environment than the position of the second feature; and
causing, by processing circuitry, for display the first feature and the second feature in the interactive 3D environment.

2. The method of claim 1, further comprising:
downloading the interactive 3D environment from a first source; and
executing the interactive 3D environment on a user equipment device comprising the processing circuitry and a storage device.

3. The method of claim 2, wherein the storage device is a remote server, and wherein identifying the subset of the plurality of videos comprises searching the remote server for content associated with the interactive 3D environment provided by the plurality of other users.

4. The method of claim 2, further comprising retrieving, from the storage device, user profile information that indicates a first measure of progress of the user in the interactive application.

5. The method of claim 1, wherein the user device may be a stereoscopic optical device.

6. A system comprising:

control circuitry configured to:

generate, by processing circuitry, a display of a interactive 3D environment comprising a first feature, a second feature, and a representation of a user in the interactive 3D environment, wherein the feature and the representation of the user have corresponding positions in the interactive 3D environment;

identify that the first feature is being accessed in the interactive 3D environment by the user; and in response to identifying that the first feature is being accessed by the user in the interactive 3D environment:

modify, by the processing circuitry, at least one of the position of the first feature and the position of the second feature, such that the position of the first feature becomes closer to the position of the representation of a user in the interactive 3D environment than the position of the second feature; and cause, by processing circuitry, for display the first feature and the second feature in the interactive 3D environment.

7. The system of claim 6, wherein the control circuitry is further configured to:

download the interactive 3D environment from a first source; and execute the interactive 3D environment on a user equipment device comprising the processing circuitry and a storage device.

8. The system of claim 7, wherein the storage device is a remote server, and wherein identifying the subset of the plurality of videos comprises searching the remote server for content associated with the interactive 3D environment provided by the plurality of other users.

9. The system of claim 7, wherein the control circuitry is further configured to retrieve, from the storage device, user profile information that indicates a first measure of progress of the user in the interactive application.

10. The system of claim 6, wherein the user device may be a stereoscopic optical device.

* * * * *